US011858725B2

(12) United States Patent
Chalmers et al.

(10) Patent No.: US 11,858,725 B2
(45) Date of Patent: Jan. 2, 2024

(54) INTERMODAL CONTAINER, HANDLING METHOD AND APPARATUS

(71) Applicants: Matthew William Chalmers, Bankstown (AU); Garry Mark Pinder, Bansktown (AU)

(72) Inventors: Matthew William Chalmers, Bankstown (AU); Garry Mark Pinder, Bansktown (AU)

(73) Assignee: LOAD AND MOVE PTY LTD, Bella Vista (AU)

( * ) Notice: Subject to any disclaimer, the term of this patent is extended or adjusted under 35 U.S.C. 154(b) by 0 days.

(21) Appl. No.: 17/462,434

(22) Filed: Aug. 31, 2021

(65) Prior Publication Data

US 2021/0395001 A1 Dec. 23, 2021

Related U.S. Application Data

(60) Division of application No. 16/807,524, filed on Mar. 3, 2020, now Pat. No. 11,148,878, which is a (Continued)

(30) Foreign Application Priority Data

Feb. 2, 2011 (AU) ................................ 2011900323
Feb. 10, 2011 (AU) ................................ 2011900440

(Continued)

(51) Int. Cl.
*B65D 88/12* (2006.01)
*B65D 25/22* (2006.01)

(Continued)

(52) U.S. Cl.
CPC ........... *B65D 88/123* (2013.01); *B65D 25/22* (2013.01); *B65D 88/121* (2013.01);

(Continued)

(58) Field of Classification Search
CPC ...... B65D 25/22; B65D 25/20; B65D 88/121; B65D 88/12; B65D 88/02; B65D 88/00;

(Continued)

(56) References Cited

U.S. PATENT DOCUMENTS 2,070,586 A * 2/1937 Fitch .................. B65D 90/0033 292/197
3,186,756 A * 6/1965 Barker ..................... B60J 7/041 296/50

(Continued)

*Primary Examiner* — Javier A Pagan
(74) *Attorney, Agent, or Firm* — WCF IP

(57) ABSTRACT

The present invention provides a lid (400) for an open container (100, 13.10), a lid lifting system (13.100), a tippler (13.200) with the improved lid lifting system (13.100) and a method of lifting a container. The lid and lifting arrangement includes an apertured receiving formation (401) on an upper side of a lid (100) to receive a lift member (13.40). The lift member (13.40) can do one or more than one of the following: engaging the formation (401) will unlock a locking mechanism (13.42,458) holding the lid (400) to a container (100); or allow the lift member (13.40) to be rotated to thereby unlock the locking mechanism (13.42, 458) which locks the lid (400) to the container (100), while simultaneously locking the lift member (13.40, 458) to the lid (400). A lifting device which is able to perform such actions is also disclosed, and a method to operate the lifting device.

15 Claims, 32 Drawing Sheets

Related U.S. Application Data continuation of application No. 15/410,830, filed on Jan. 20, 2017, now abandoned, which is a continuation of application No. 13/983,139, filed as application No. PCT/AU2012/000097 on Feb. 2, 2012, now Pat. No. 9,592,932.

(30) Foreign Application Priority Data

| | | |
|---|---|---|
| Jun. 23, 2011 | (AU) | 2011902466 |
| Jan. 25, 2012 | (AU) | 2012100083 |
| Jan. 25, 2012 | (AU) | 2012100084 |
| Jan. 25, 2012 | (AU) | 2012100085 |

(51) Int. Cl.

| | |
|---|---|
| ***B66C 1/22*** | (2006.01) |
| ***B66C 1/66*** | (2006.01) |
| ***B66C 13/08*** | (2006.01) |
| ***B65D 90/00*** | (2006.01) |
| ***B65D 90/08*** | (2006.01) |

(52) U.S. Cl.
CPC ....... *B65D 88/126* (2013.01); *B65D 90/0026* (2013.01); *B65D 90/0033* (2013.01); *B65D 90/08* (2013.01); *B66C 1/223* (2013.01); *B66C 1/663* (2013.01); *B66C 13/08* (2013.01)

(58) Field of Classification Search
CPC .. B65D 88/122; B65D 88/123; B65D 88/124; B65D 88/126; B65D 90/0026
See application file for complete search history.

(56) References Cited

U.S. PATENT DOCUMENTS

| | | | | | |
|---|---|---|---|---|---|
| 3,478,919 | A * | 11/1969 | Turpen | B65D 88/126 | 292/160 |
| 3,481,503 | A * | 12/1969 | Kloess | B65D 88/126 | 292/68 |
| 3,750,826 | A * | 8/1973 | Donath | B65D 88/126 | 292/161 |

* cited by examiner

INTERMODAL CONTAINER, HANDLING METHOD AND APPARATUS

FIELD OF THE INVENTION

The present invention relates in general to containers and container constructions having ISO fittings for lifting and handling, more particularly to containers for bulk materials, especially containers that have reinforced side walls, wherein the contents are discharged by tipping or rotating the container.

Further, the present invention also relates to containers of the open top kind for the handling and transport of bulk materials. These containers may be full height or half height, and in particular to lids, lid systems and lifting systems for engagement of those lids, which lid lifting systems can be mounted on to tippler or container rotators, or mounted on lifting devices adapted to lift said containers and or lids.

BACKGROUND OF THE INVENTION

Containers for materials such as liquids, ores, minerals, sand, powders, waste, or grains such as wheat are available. These can be handled by machines called tipplers, whereby the containers can be pivoted or tipped to discharge their contents. An issue with containers for bulk ore or liquid materials is that the container content creates a load on the container side walls, and can cause deflections in the side walls. To reduce deflections or buckling during rotation caused by the load, the walls of the container have been reinforced by cross braces as in PCT/GB2010/000122 or by top braces as in WO9513233.

Open containers have manually closed by lids which have fork tyne receptors on the lid, to enable a fork lift to place a lid onto or move a lid from a container. The lids are used during the transport phase to protect the bulk material from the weather and to prevent the action of wind from forming dust from the bulk material during transport.

Once the container gets to its destination such as a transfer location, by means of the tyne receptors a fork lift will move the lid off the container and then the container will be delivered to a tipping or tippler device which will engage the container and lift and rotate the container to discharge the contents of the container into a desired location. This tipping process can require the container to be rotated 180 degrees to discharge the bulk product by the tippler.

Such tipplers are generally attached to ships cranes or ship to shore cranes or shore cranes or mobile habour cranes and the container can rotated and discharged directly in the hull of the bulk container of ocean going vessels.

Current practice is that these lids are manually locked in place by ground personnel and removed using a fork lift. The container is then lifted and emptied into the ship.

Any reference herein to known prior art does not, unless the contrary indication appears, constitute an admission that such prior art is commonly known by those skilled in the art to which the invention relates, at the priority date of this application.

SUMMARY OF THE INVENTION

The present invention also provides a container for transporting material said container having ISO corner fittings, characterised in that said corner assembly or fittings are formed from a generally box like structure as a main body, and at least one gusset formation extending there from. There can be included a plurality of gusset formations.

The present invention also provides a corner reinforcing arrangement formed from a body such as an ISO corner fitting and a post, and at least one gusset formation extending therefrom, or a multiple number of gusset formations extending therefrom.

The gusset formation can includes one or both of the following: a face angled to the horizontal plane; a face angled to the vertical plane.

The corner reinforcing arrangement can be such that the at least one gusset formation has a three-dimensional shape.

The corner reinforcing arrangement can be such that the gusset formation of a generally triangular configuration.

The corner reinforcing arrangement can be such that a part of the periphery of the gusset formation is welded to the corner or post, with another part being welded to a lateral or longitudinal beam of said container.

The corner reinforcing arrangement can be such that the gusset formation extends inwardly from the corner or post and laterally of a longitudinal axis of the container or parallel thereto.

The gusset formation can be formed from an outboard triangular plate and an inboard plate having a triangular or trapezoidal shape, said outboard and inboard plates being connected by a rectangular plate.

The present invention also provides a container having corner reinforcing arrangement as described in the preceding paragraphs.

The container can have four upper corners being formed by such a corner reinforcing arrangement.

The lower corners of the container can include generally triangular shaped gusset formations between lower corners and beams or rails of said container.

The forward and rearward ends of said container can include an upper beam which extends between respective corner posts and or corners, said upper beam having an inboard edge or side which is internally offset from the posts and or corners.

The forward and rearward ends of said container can include a lower beam which extends between respective corner posts and or corners, said lower beam having an inboard edge or side which is internally offset from the posts and or corners.

The inboard edge or side lower beam can be internally offset by a greater distance than the inboard edge or side of said upper beam.

The present invention provides a lid having a cover portion which is sized and shaped to be received onto said open container so as to cover, at least substantially, an opening at the top of the container, the cover portion including at, at least one location thereon, at least one aperture formation into which can be received a lifting member, which is located on the end of a lifting cable or lifting frame, for releasably locking said cable or said frame to the lid.

A plurality of aperture formations can be located on the lid, the aperture formations can be one of the following: formed separate and attached to the lid; formed integrally in the lid; or are apertures formed in the lid.

The aperture formations can be ISO-fittings or fittings which comply with ISO standards.

The lid can be manufactured from sheet metal, steel, plastic or composite material.

The aperture formation(s) can cooperate with a locking mechanism, the locking mechanism locking the lid to the container. The aperture may also be only for lifting, and locking and unlocking is maintained as a manual process.

The aperture formation(s) can receive the lift member or rotating or twist locking member which causes the lid to be unlocked from the container.

The aperture formation can be associated with a lever means which will, when rotated, cause a lock which engages said container to be released.

The lid can include centrally or peripherally located apertured receiving formations.

There can be one or more locking bars which extend from said receiving formations to lock said lid relative to said container.

The action of the lift member entering said aperture formation(s) can cause a lever of said locking mechanism to move said locking mechanism from a locked to an unlocked condition.

The action of the lift member entering said aperture formation(s) enables a portion of said lock mechanism to be rotated from a locked to an unlocked condition.

The lever means can rotate about a generally vertical axis.

The lever means can rotate about a generally horizontal axis

The lever means can be biased to a lock condition by means of one or a combination of two or more of the following: gravity, a spring bias, a portion spring, tension spring, a compression spring.

The action of lifting members on a lid lifting device engaging said receiving formation on said lid causes said locks to move to unlocked conditions.

The lifting member on a lid lifting device, in moving to disengage from said receiving formations on said lid, can cause said locks to move to a locked condition so that once the lift members are able to separate from the receiving formations the lid is locked to a container or said locks are in a locked condition.

The apertured or receiving formations receive a respective lift member in a vertical direction.

The engagement of a respective lid lift member to said apertured formation(s) will operate by one of the following: (a) simultaneously lock the lid lift member to the respective apertured formation and unlock the lid from the container; (b) sequentially unlock the lid from the container and then lock the lid lift member to the respective apertured formation; (c) sequentially lock the lid lift member to the respective apertured formation then unlock the lid from the container.

The present invention also provides a lifting device for lifting a container, the device including means to engage fittings at the corners of a container to be lifted, the device, including a second lifting means which operates to releasably engage a lid associated with the container.

The lifting device can be associated with or is formed as part of a lifting vehicle such as a crane or can be connected to a crane or material handling equipment.

The device can also be adapted to rotate the container to discharge its contents.

The second lifting means can lift the lid out of the path of the container rotation.

The second lifting means can be operable independently of the lifting of the container, so that the lid can be lifted from the container, while the container is being moved, or before the container is being moved, or to allow the container to be deposited after being transported with the lid remaining on the device.

The second lifting device can include a lifting member which has a rotating or twisting locking member to engage an aperture formation on the lid, so a to lock the second lifting means to the lid.

The lifting member or rotating or twisting locking member also releases a lock which locks the lid to the container The second lifting means can have a multiple of the lift members or rotating or twist locking members to engage a like multiple of the aperture formations on the lid.

The present invention further provides a method of handling an open container which has a lid to covers an opening of the container, the method including the steps of providing a lifting device as described above, wherein the lifting device is controlled so as to lift the container and the lid or lift the container and lift the lid from the container; or to lift just the lid from the container.

Lifting the container and the lid, or lifting the container and lifting the lid from the container can be performed sequentially or simultaneously.

The method can include the step of rotating the container to discharge the contents of the container.

Prior to rotating the container, the lid is lifted off the container and transported to a location relative to the container without a rotation envelope of the container.

There can be is included a step of unlocking the lid relative to the container, by the engagement of the lifting device to at least one aperture formation on the lid.

The lid can include centrally located twist lock receiving formations.

One or more locking bars radiate from said receiving formations to lock said lid relative to said container.

The action of twist locks on a lid lifting device engaging receiving formation as on said lid can cause said locks to move to an unlocked conditions.

The action of twist locks on a lid lifting device, in moving to disengage from said receiving formations on said lid, will cause said locks to move to a locked conditions so that once the twist locks are able to separate form said receiving formations said lid is locked to a container or said locks are in a locked condition.

The present invention provides a container for transporting bulk materials, said container having ISO fittings at spaced locations thereon for the lifting and or handling of said container, said container including a support structure interconnecting a first wall and another wall or surface, the structure having a first apex or corner which connects with the first wall, a second apex or corner which connects with a floor of the container, and an apex or third corner.

The third corner or apex can connect with the opposing wall, the first and third corners or apexes being located at about the same distance from the floor.

The second corner or apex can also connect with the first wall, and the third corner or apex can connect with the floor of the container.

The container can include a second support structure having a first corner or apex can connect with the opposing wall, a second corner or apex can connect with the floor of the container, and a third corner or apex can also connect with the floor of the container.

The second corner or apex of the first support structure and the second corner or apex of the second support structure can overlap with each other and can be located near a midpoint of the floor of the container.

The second corner or apex of the first triangular structure and the second corner or apex of the second triangular structure can be located on opposite sides of a longitudinal centreline of the floor of the container.

Between the first and third corners or apexes there can be defined a top edge of the support structure, there being a clearance or space between a top edge of the container and at least a portion of the top edge of the support structure.

The clearance or space is provided along a central portion of the top edge of the support structure.

The support structure can include a plate having said first, second, and third corners or apexes.

The plate can have at least one hollowed out section.

The three corners or apexes can be formed by three members of the support structure, with a first member extending at least between said first and second corners or apexes, a second member extending at least between the second and third corners or apexes, and a third member extending at least between the first and third corners or apexes.

The member extending between the first and third corners is a top member, the member extending between the first and second corner and the member extending between the second and the third corners are side members.

The top member can be located between intermediate portions of the side members.

The top member can extend between the first wall and the opposing wall.

Each member can be formed from a tensile member such as a cable or a chain, which can also include a means of tensioning, such as a turnbuckle.

The support structure can also include a gusset located between any two of the three members.

The support structure can be joined directly to the container.

The support structure can be attached to mounting plates which are joined to the container.

The support structure can be welded pinned or bolted to the container.

BRIEF DESCRIPTION OF THE DRAWINGS

An embodiment or embodiments of the present invention will now be described, by way of example only, with reference to the accompanying drawings, in which.

DETAILED DESCRIPTION OF THE EMBODIMENT OR EMBODIMENTS

Figure 1:
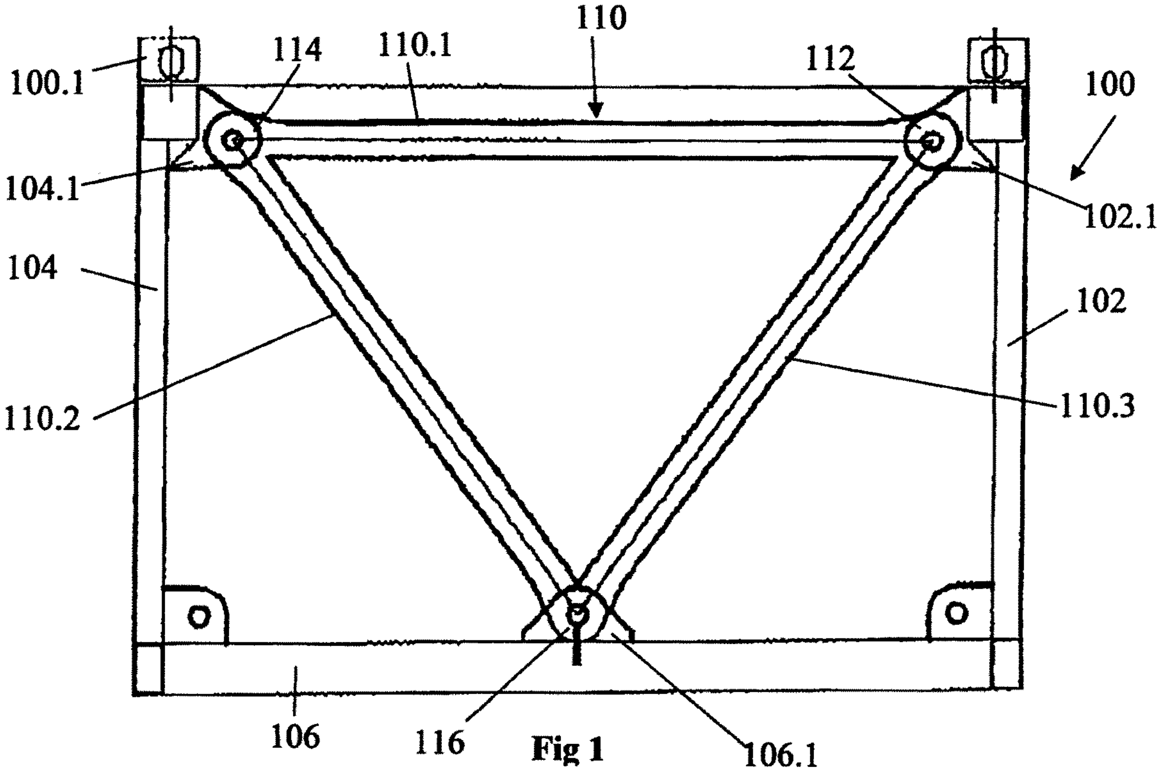
FIG. 1 is a sectional view of a container midsection with an internal brace.
Figure 1A:
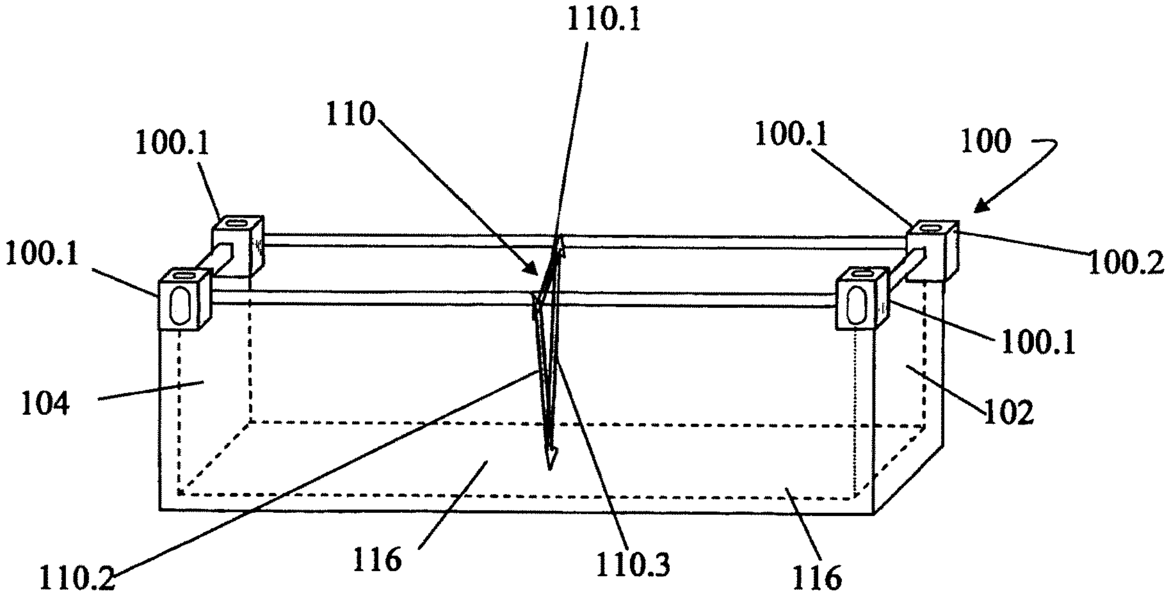
FIG. 1A is a partial perspective view showing a container and one internal brace for the container.

FIGS. 1 and 1A depict a container 100 with internal bracing. In this view, two opposing walls 102, 104, and bottom 106 are visible. The support structure or internal brace 110 made up of integrally formed members 110.1, 110.2, and 110.3 reinforces the side walls 102 and 104, to assist them in resisting deformation when a bulk material is weighing down on a single side wall during a tipping operation. The brace 110 forms a triangular shape, having a first apex or corner 112 which is connected to side wall 102 via an apertured mounting plate 102.1 which is welded to the side wall 102 at the square hollow section top rail thereof, which is illustrated in cross section in FIG. 1; a second apex or corner 116 which is connected to the container floor 106 via an apertured mounting plate 106.1 which is welded to the floor 106; and a third apex or corner 114 which is connected to the opposing wall 104 via an apertured mounting plate 104.1 which is welded to the side wall 104 at the square hollows section top rail thereof, which is illustrated in cross section in FIG. 1.

ISO fittings 100.1 are provided at the container's four top corners 100.2, allowing for the manoeuvring and handling, such as lifting, of the container 100 by e.g. a crane. The container 100 is therefore compliant with ISO specifications.

FIG. 1A shows a container with see-through sides to illustrate the location and arrangement of the brace 110 which is provided to support the longitudinal walls 102 and 104. When the container 100 is rotated to dispense the contents, the load created by the weight of the content bears on the longitudinal walls 102 or 104 (depending upon the direction of rotation, and the brace 110 reinforces the respective longitudinal wall against this load during rotation.

The internal brace 110 can be attached by bolts or pins to the mounting plates 102.1, 106.1 and 104.1, or can alternatively be welded thereto or welded directly to the sidewalls 102, 104 and the floor 106. Alternatively the brace 110 can be attached to gusset plates which are themselves attached by pins or bolts to the container 100.

The brace 110 can be one piece as illustrated in FIG. 1, or can be made up of a multiple of members joined together via methods such as welding or bolting. This is able to be done as the braces members 110.1, 110.2, and 110.3 act predominantly in tension, particularly during tippler rotation processes.

Figure 2:
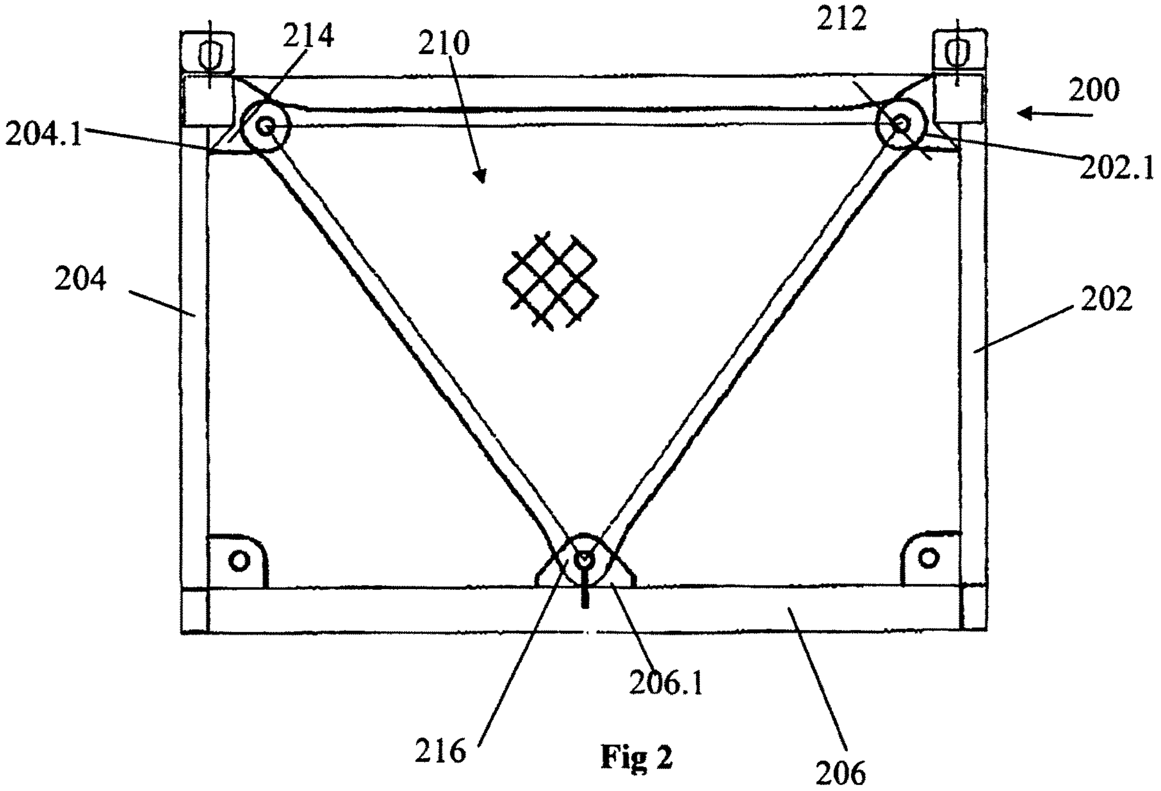
FIG. 2 is a sectional view of a midsection of a container within another internal brace.

As depicted in FIG. 2, the internal brace can be a triangular plate 210 bound approximately by the three apexes 212, 214, and 216.

Figure 3:
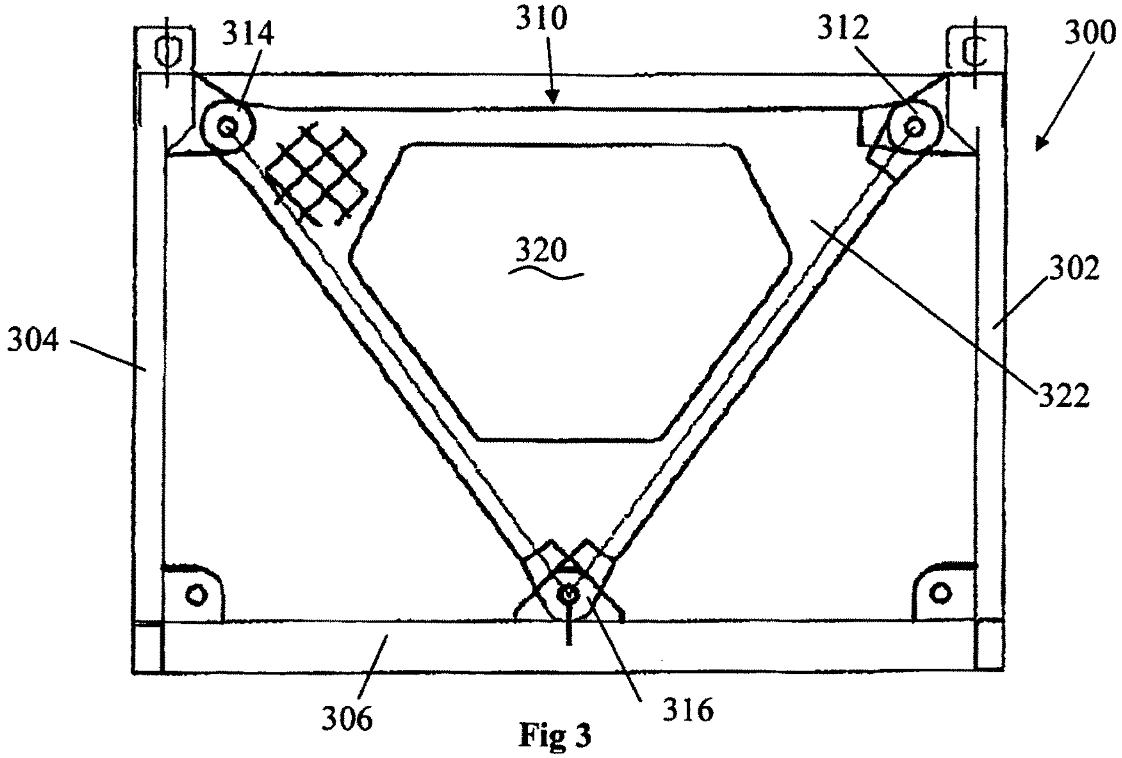
FIG. 3 is a sectional view of a midsection of a container within a further internal brace.

Referring to FIG. 3, the internal brace 310 can have a hollowed out section 320, to reduce the weight. The rim area 322 around the hollowed out section 320 provides for the transmission and bearing of forces.

Figure 4:
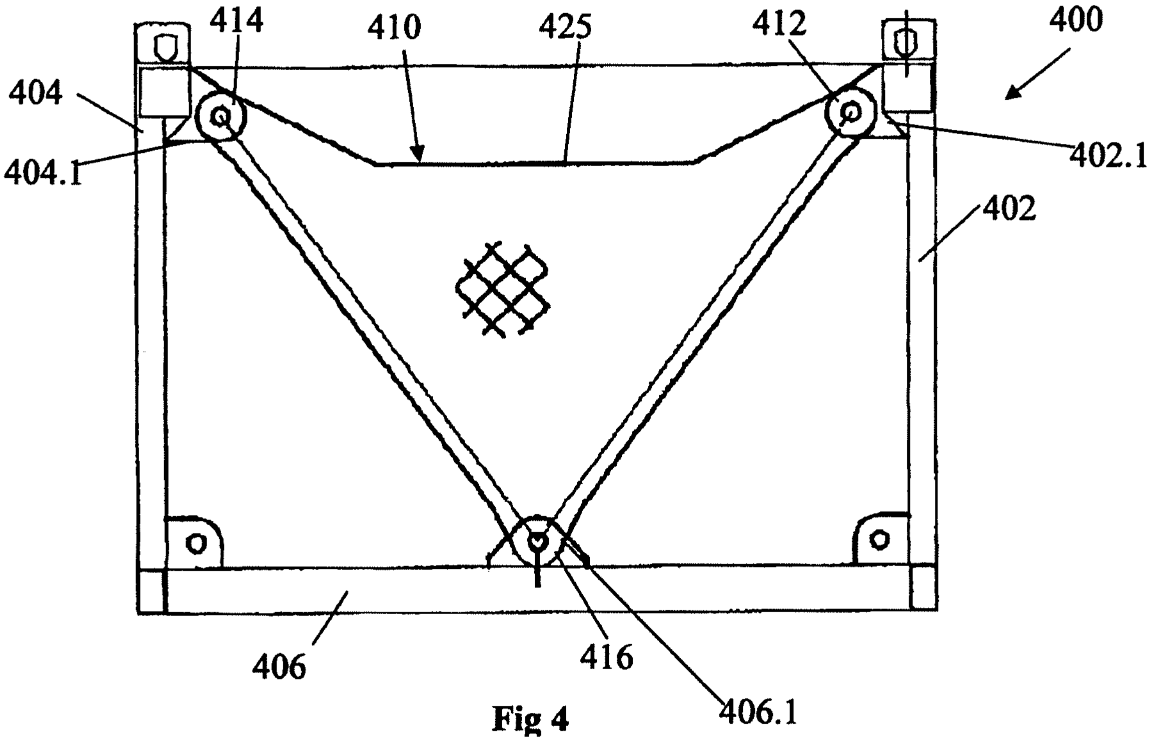
FIG. 4 is a sectional view of a midsection of a container within a further internal brace.

Referring to FIG. 4, the top portion of the internal brace 410 can be recessed, for example it can be scalloped out, so that the brace 410 has a recessed top 425. The recessed top 425 is partially recessed with respect to the top of the container 400. However it can alternatively be wholly recessed with respect to the top of the container (e.g. see FIG. 8). The corners 412 and 414 of brace 410 in this embodiment are located at approximately the same level as the top of the container 400.

Figure 5:
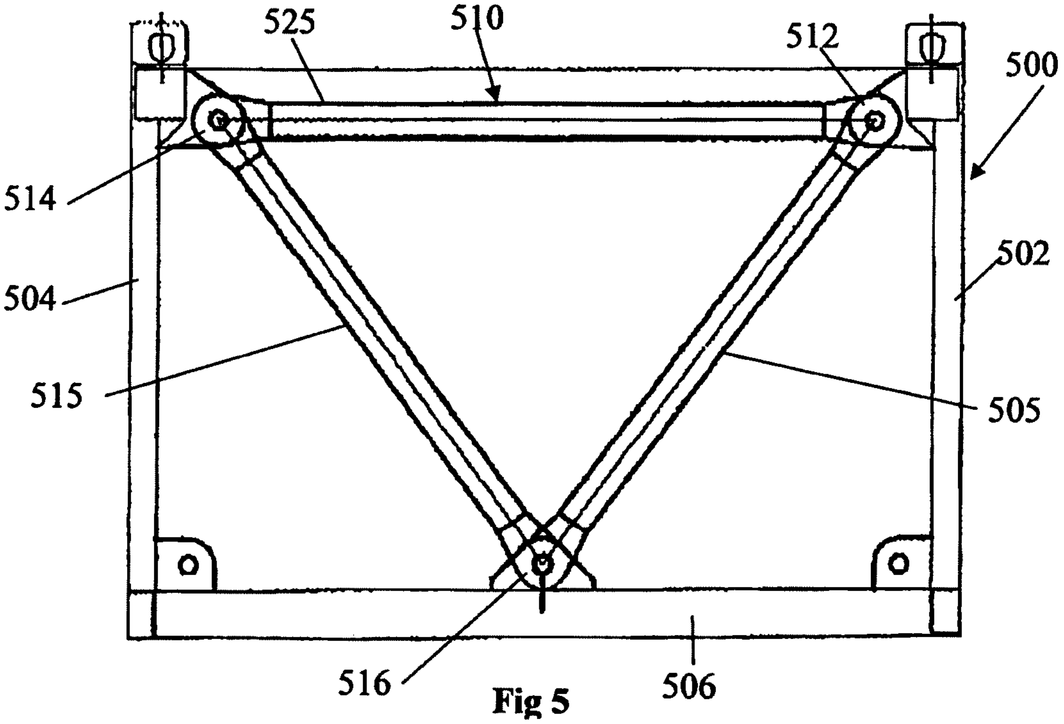
FIG. 5 is a sectional view of a midsection of a container within a further internal brace.

Referring to FIG. 5, the internal brace 510 can comprise three separate members 505, 515, and 525. Side member 505 connects between one side wall 502 to the floor 506, opposing side member 515 connects the opposite side wall 504 to the floor 506, and the top member 525 connects the opposing side members 505 and 515. Each of the individual members 505, 515, and 525 can substantially extend between two of the brace's three corners 512, 514, and 516. For instance apertured mounting plates can be provided at each of the three apexes 512, 514, and 516, and each member can have end openings which align with the apertures. Screws, bolts, pins, or rivets can be used to secure them together. The members 505, 515, and 525 can alternatively be welded together at each of the three apex locations 512, 514, and 516.

In this embodiment the internal brace 510 forms a triangle, and provides more stability to the container 500 than a V-shaped brace having only the opposing side members 505 and 515. The top member 525 helps stabilise the side members 505 and 515 by limiting their movement with respect to each other. In the orientation shown in FIG. 5, the horizontal movement of the side members 505, 515 is limited.

Figure 6:
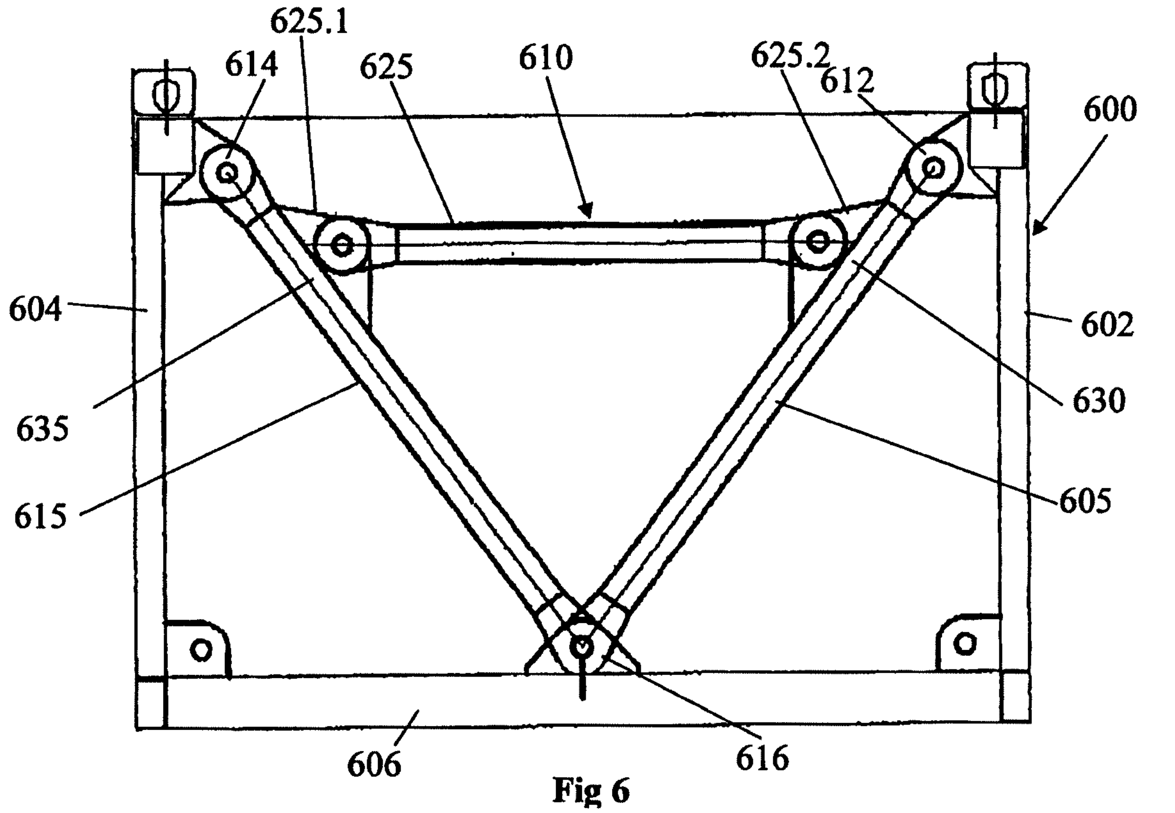
FIG. 6 is a sectional view of a midsection of a container within a further internal brace.

Referring to FIG. 6, an internal brace 610 with three members 605, 615, 625 as described above can also be recessed at its upper location. For example the top member 625 can extend from an intermediate portion 630 along the side member 605 to a corresponding intermediate portion 635 along the opposing side member 615. The side members can have mounting plates 625.1 and 625.2 at these intermediate portions 630 and 635, and the top member 625 can be attached between these mounting plates. The lower height of the top member 625 provides extra clearance between the top of the container 600 and the top of the internal brace 610 to assist in providing greater clearance for front end loaders.

Figure 7:
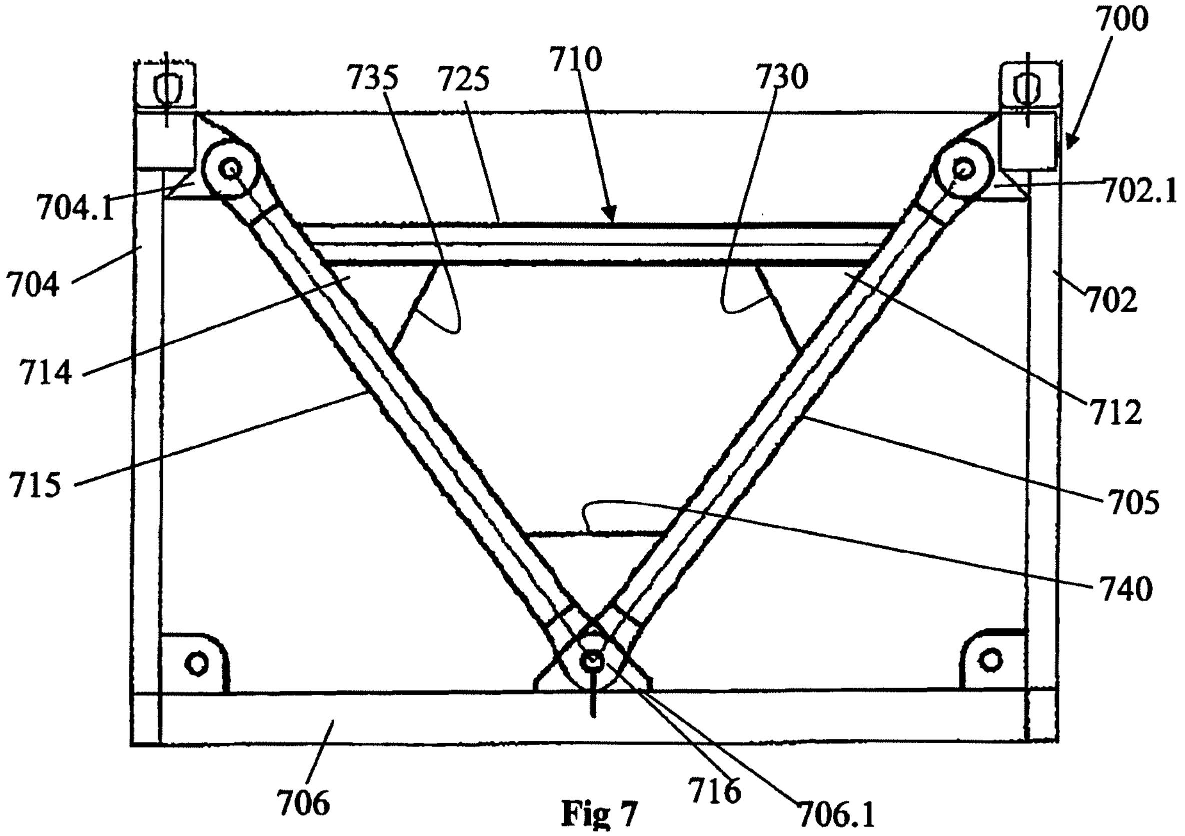
FIG. 7 is a sectional view of a midsection of a container within a further internal brace.

Alternatively, as shown in FIG. 7, the top member 725 can be welded or bolted directly to the side members 705 and 715 at an intermediate height along the side members 705 and 715. The side members 705 and 715 therefore each extend from the floor mounting plate 716 to beyond the top corners 712 and 714, to connect with the sidewalls 702 and 704. There can further be gussets 730, 735, and 740 provided between the brace members 705, 715, and 725 to provide extra stability and strength.

The jointing between the internal brace and the container, or the jointing between individual brace members in embodiments where the internal brace is not one piece, can be permanent or temporary. The temporary jointing can be achieved using removable screws, bolts, or pins. Gussets or attachment plates can be provided at the connection points and mounting plates for the purpose of attaching the internal brace to the side walls or the container floor. These gussets can be joined to the container by temporary or permanent jointing techniques of bolting, welding, and the like.

Figure 8:
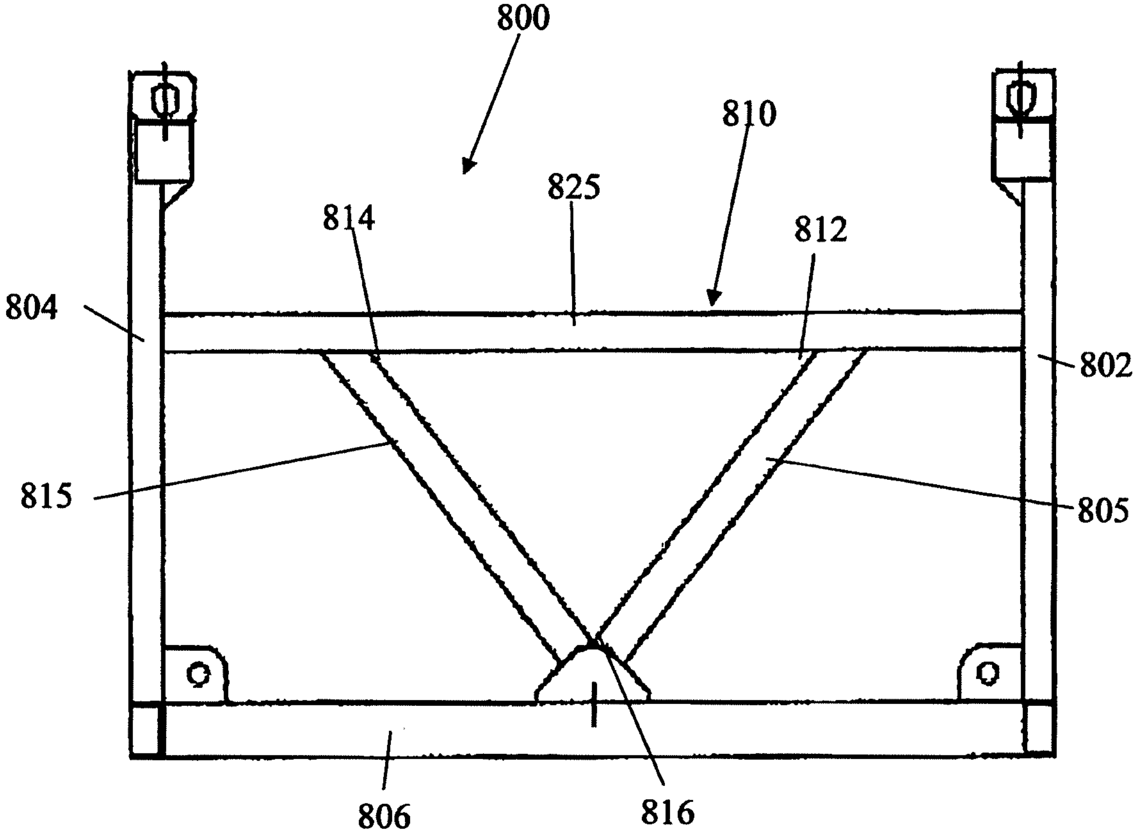
FIG. 8 is a sectional view of a midsection of a container within a further internal brace.

Referring to FIG. 8, the horizontal top member 825 passes horizontally through the top corners 812 and 814, and provides connection between the side walls 802 and 804. Side members 805 and 815 of the internal brace 810 each extend from the container floor mounting plate 816 to spaced intermediate portions of the top member 825. The internal brace 810 is has a substantially triangular configuration.

Figure 9:
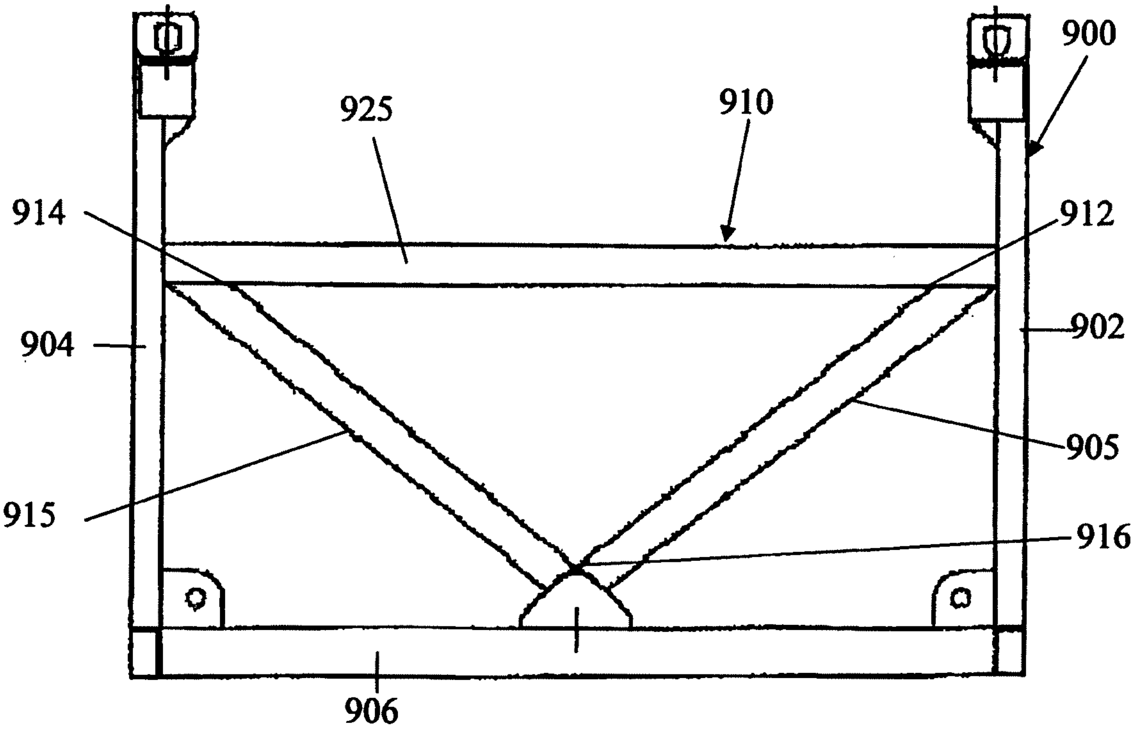
FIG. 9 is a sectional view of a midsection of a container within a further internal brace.

In a similar embodiment shown in FIG. 9, the side members 905 and 915 of the internal brace 910 each connect between the container floor attachment 916 to one end of the horizontal top member 925 of the internal brace 910.

In each of the embodiments described with reference to FIGS. 5 to 9, the internal brace can be formed of a single piece such as a solid plate or a plate with one or more hollowed out sections. The plate or the individual members which form the internal brace can further be made of separate elements which improve the structural rigidity of the internal brace. The internal brace can also be made of individual tensile sections such as cables or chains, which can include a means for adjustment such as a turnbuckle, or the struts of the brace can be large turnbuckles, which will allow for ready and easy replacement if damaged. Each section can be replaced or adjusted as appropriate.

Figure 10:
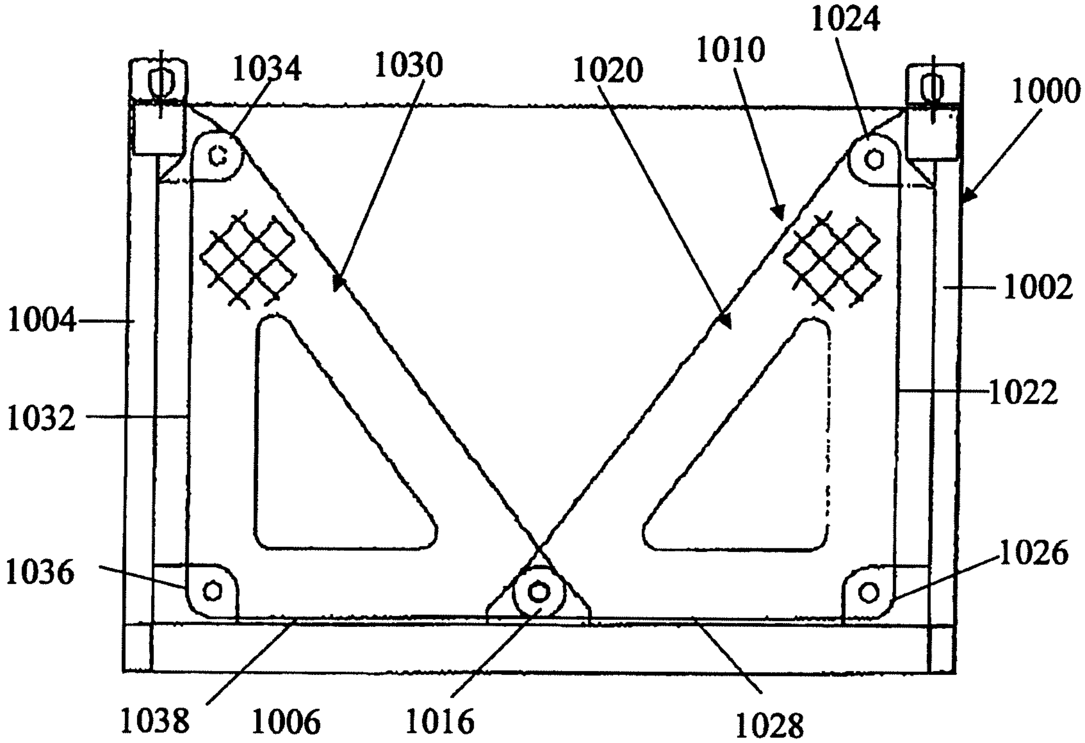
FIG. 10 is a sectional view of a midsection of a container within a further internal brace.
Figure 11:
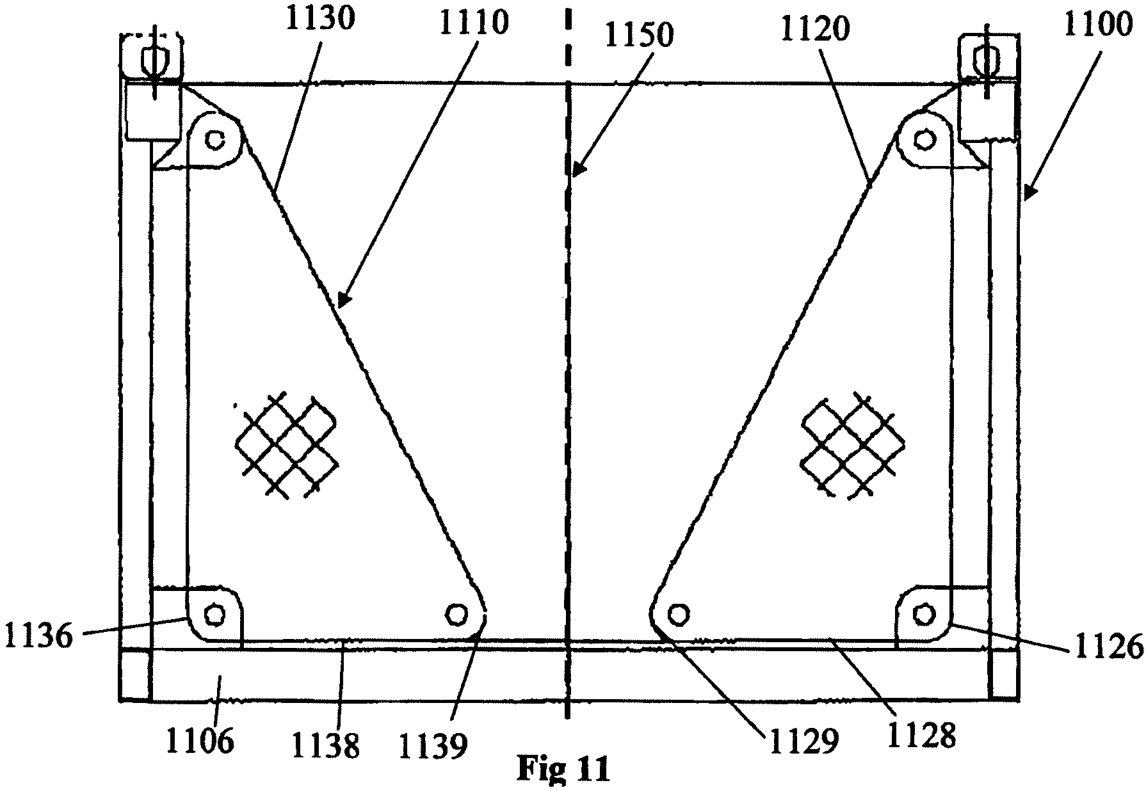
FIG. 11 is a sectional view of a midsection of a container within a further internal brace.
Figure 12:
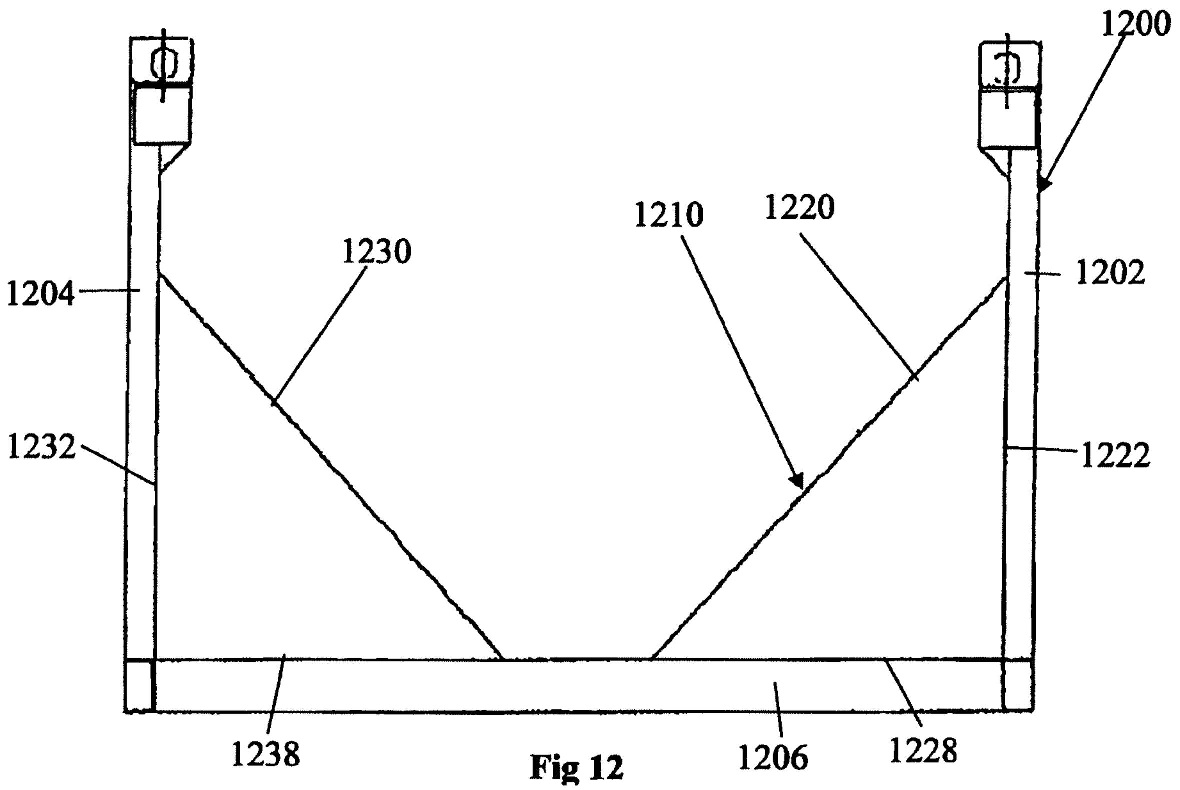
FIG. 12 is a sectional view of a midsection of a container within a further internal brace.

In each of the examples depicted in FIGS. 10 to 12, the internal brace includes more than one triangular structure. In FIG. 10, the internal brace 1010 includes a first structure 1020 and a second structure 1030. The first part 1020 has a side edge 1022 located against or adjacent sidewall 1002. The side edge 1022 extends between two corners 1024 and 1026 of the first structure 1020. The first part 1020 is jointed to mounting plates at the corners 1024 and 1026, and the mounting plates are in turn attached to the sidewall 1002.

The second part 1030 has a side edge 1032 located against or adjacent sidewall 1004, and extending between two corners 1034 and 1036 of the first structure 1030. The second part 1030 is joined to mounting plates at these corners, and the mounting plates in turn are attached to the sidewall 1004. The mounting plates can be welded to the sidewalls 1002, 1004. The first and second parts 1020 and 1030 respectively have a bottom edge 1028 and 1038 which are generally close to and/or parallel to the container floor 1006. The bottom edges 1028 and 1038 can overlap each other, so that their inner ends overlap and are joined to a single floor mounting plate 1016. The floor mounting plate 1016 can be welded to the floor 1006. The first and second parts 1020 and 1030 each have a hollowed out section to reduce weight.

As seen in FIG. 11, the first and second parts 1120 and 1130 do not overlap. Instead their bottom edges 1128 and 1138 extend from the corresponding outer corners 1126 and 1136 to inner corners 1129 and 1139. The end points 1129 and 1139 are located on either side of the centre line 1150 through the container floor 1106. The first and second parts 1120 and 1130 can be solid plates with or without hollowed out sections. Alternatively, instead of being solid or hollowed out plates the parts in the internal brace 1010 or 1110 can be individual or welded together members.

FIG. 12 depicts another bracing method. The internal brace 1210 has two triangular parts 1220 and 1230 which are fully welded to the container 1200. The side edge 1222 of triangular part 1220 is welded to sidewall 1202, and the side edge 1232 of triangular part 1230 is welded to the opposite sidewall 1204. The bottom edges 1228 and 1238 of the parts are both welded to the container floor 1206. The bottom edges can terminate without overlapping, similar to the embodiment depicted in FIG. 11. If desired, the bracing 1210, in particular parts 1220 and 1230, can additionally or alternatively, be positioned at locations other than the middle of the container and internal of the container. That is, they can be located externally adjacent the end walls or internally adjacent the end walls.

Figure 14:
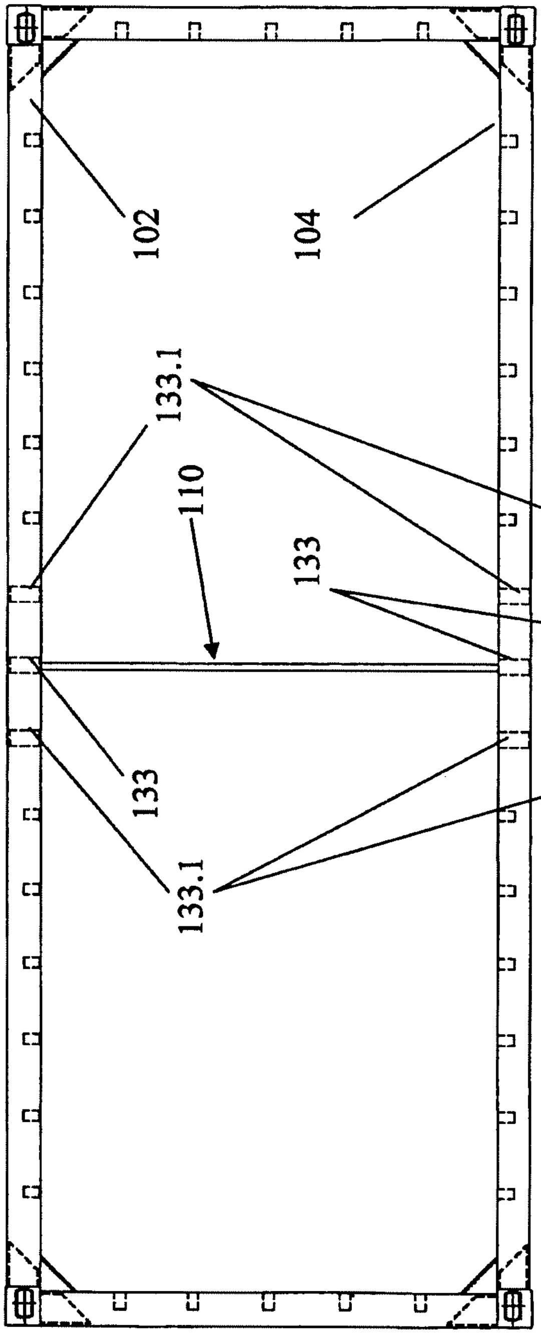
FIG. 14 illustrates a plan view of a container having reinforcements such as in FIG. 13, and side wall reinforcements near the centre located support.
Figure 15:
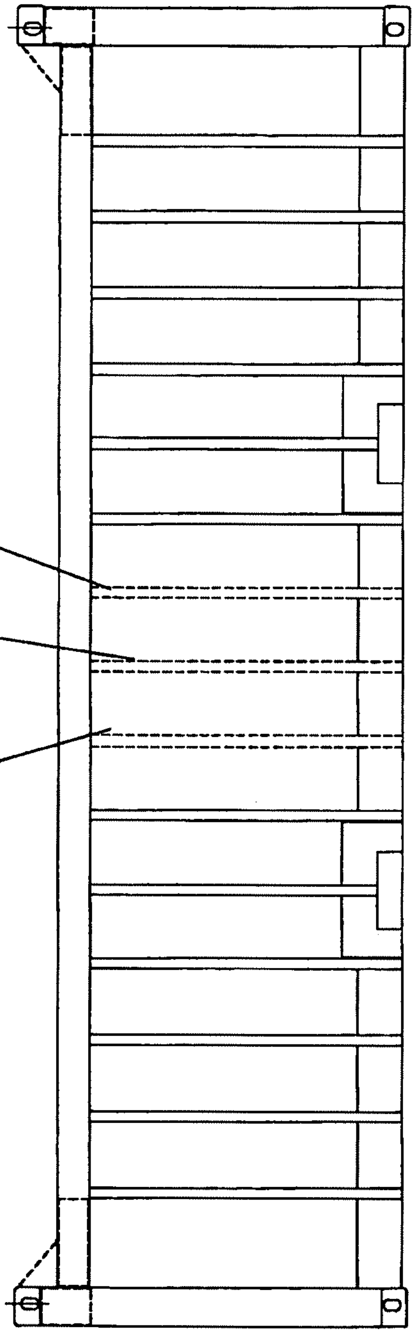
FIG. 15 is a front view of the container of FIG. 14.

As illustrated in FIGS. 14 and 15, the container can be such that the required side wall mounting plates such as plate 102.1 and 104.1 of FIG. 1 (or those connecting to corners 1036 and 1026 in FIGS. 10 and 11) are located on sidewall reinforcing posts 133 welded to the sidewalls 102 and 104. These provide extra reinforcement. Further reinforcement can be provided by welding additional posts such as 133.1 to side walls 102 and 104 on either side of the post 133, as also illustrate din FIGS. 14 and 15. The posts 133 and 133.1 are preferably rectangular hollow section members (RHS) welded into place. However, other forms of reinforcing members such as profile plates (e.g. triangular plates welded to the outside of the container) or I-beam, C-beam or H-beam could be used.

The braces 110 as described above assist to also reinforce and strengthen the floor of the container, because of the location of a brace connection with the floor in an intermediate region or near there. If desired, under the floor in the region of the mounting plate for the brace, there can be provided a reinforcement, similar to the RHS post of FIGS. 14 and 15, so as to provide event greater resistance to deflection.

In the some of the figures above apertured mounting plates are indicated by the numerals X02.1, X06.1 and X04.1 where the X represents the figure number. In some figures such as in FIGS. 3, 5, 6 and 8 to 12, mounting plates, whether apertured or otherwise, are indicated at one or more apex of the support structure.

Figure 16:
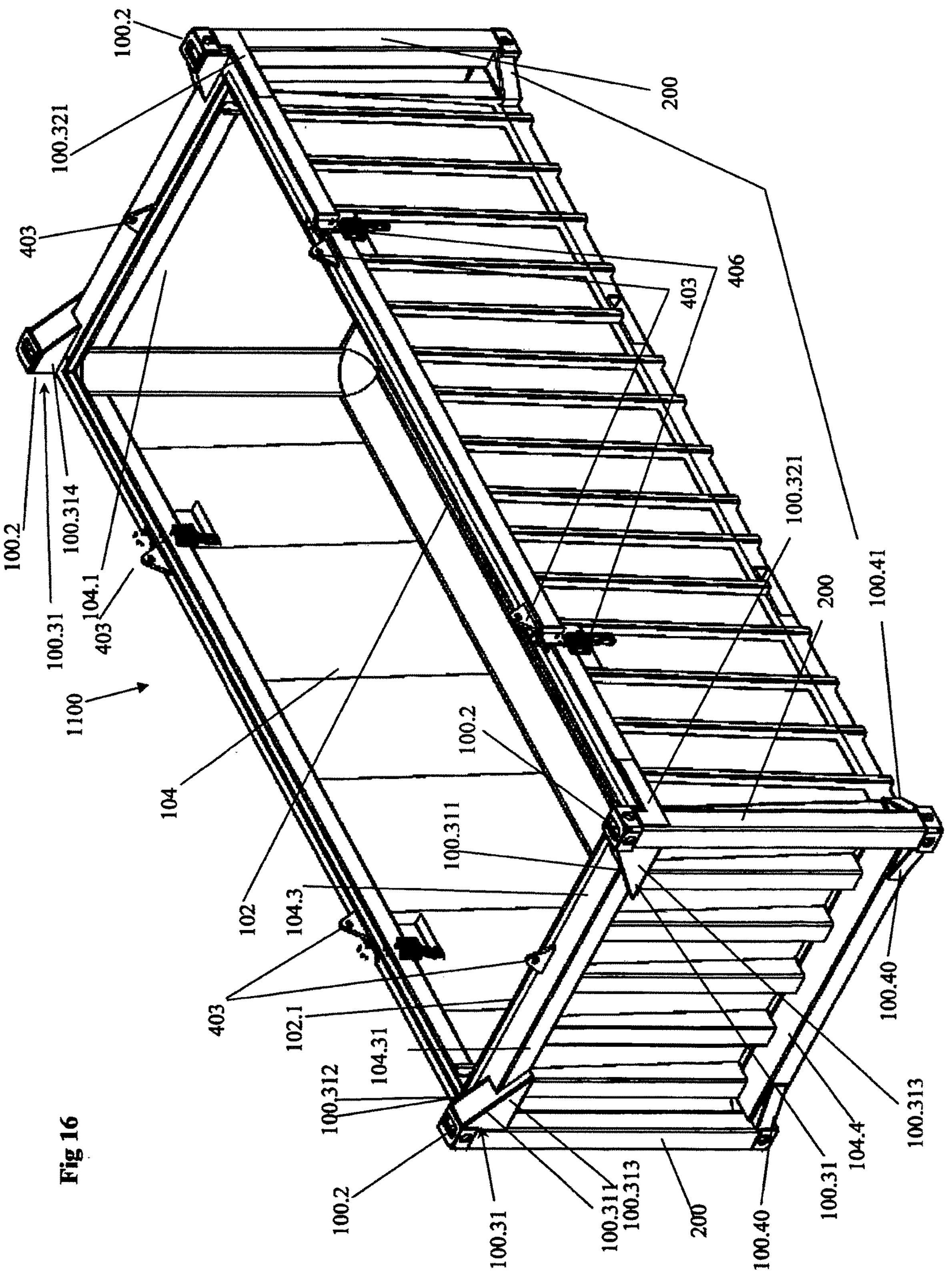
FIG. 16 is an upper front side perspective view of another container.
Figure 17:
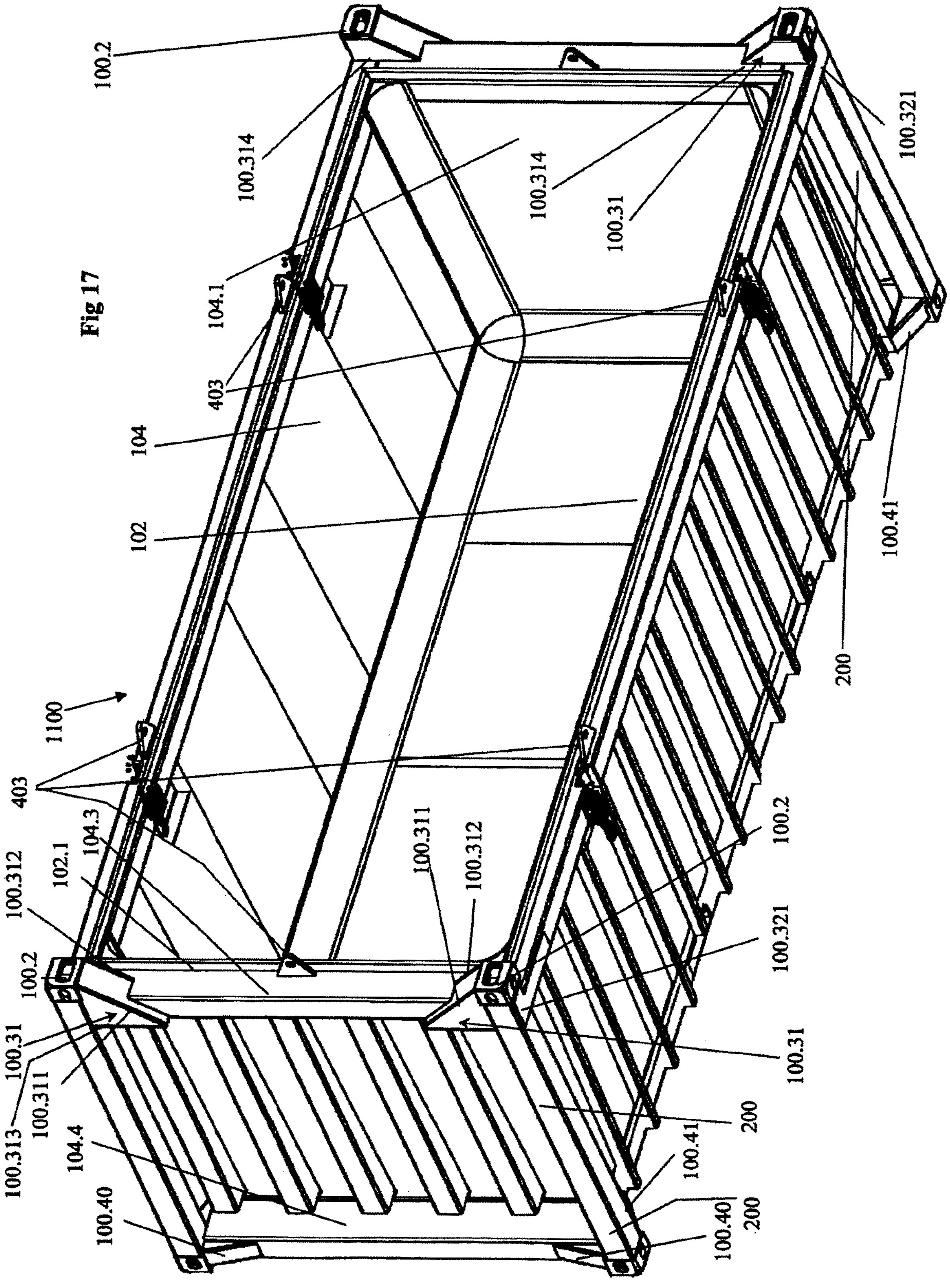
FIG. 17 is a perspective view of the container of FIG. 16.
Figure 21:
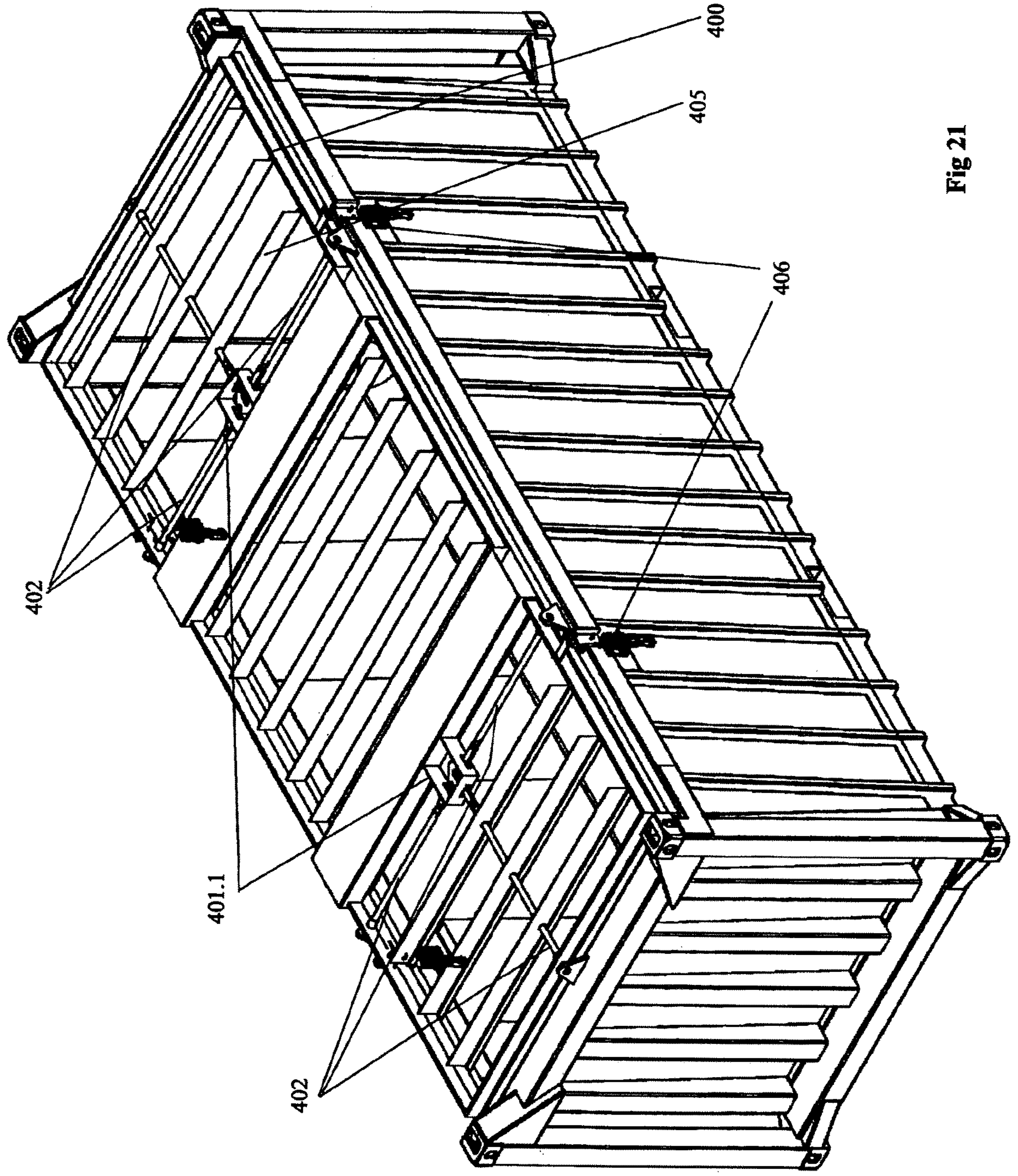
FIG. 21 illustrates a perspective view of the Id of FIGS. 18 to 20, in place on a container with the upper sheeting removed.
Figure 31:
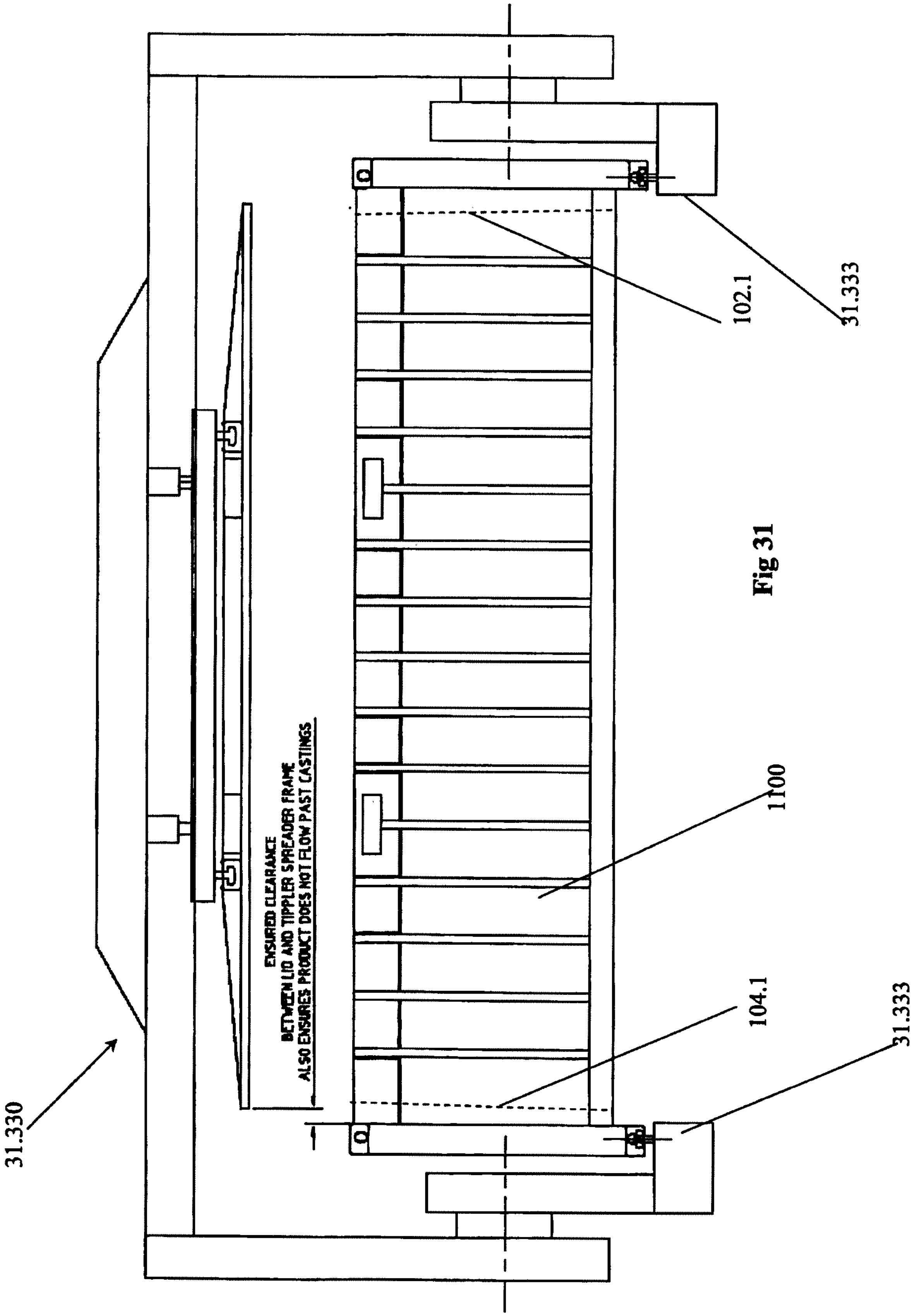
FIG. 31 illustrates a front view of the container of FIGS. 16 and 17 in an upside down condition in a tippler apparatus.

As illustrated in FIGS. 16, 17 and 21 are various views of a container 1100 which has tapered long side walls 104 and 102 as well as tapered end walls 104.1 and 102.1. The tapering of these walls is best viewed in FIG. 16 where a taper of approximately 1 to 5 degrees to the vertical, and most preferably 2 degrees, is visible with respect to the vertical on these four walls. This taper will assist this container, when being rotated through 180 degrees as illustrated in FIG. 31, to disgorge all its contents more readily than if such walls were not tapered. These tapers also serve another function as will be described in more detail below.

Figure 13:
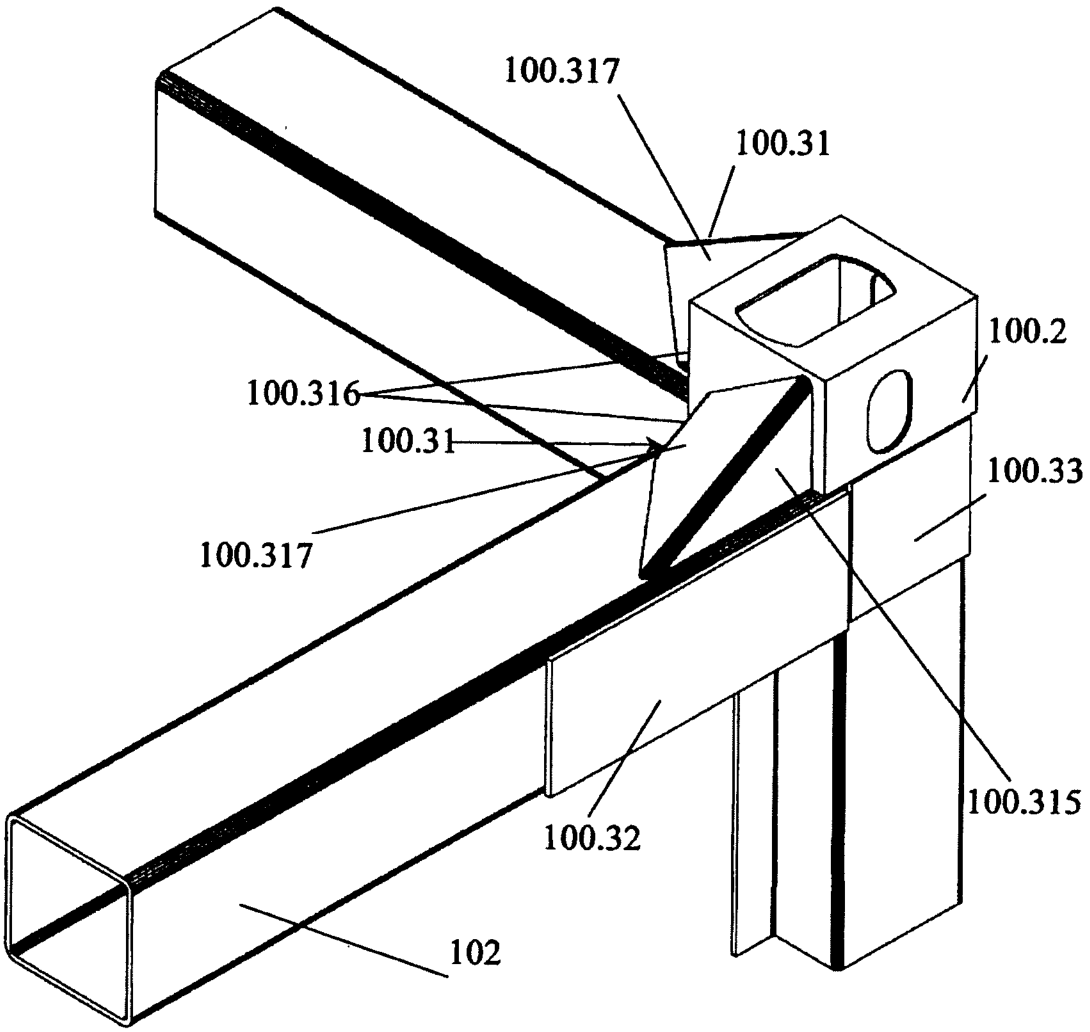
FIG. 13 illustrates a perspective view of ISO corner fitting reinforcement.

To reinforce the ISO corner fittings 100.2 of a container, as illustrated in FIGS. 13 to 15, the corners 100.2 are each reinforced by angled corner gussets 100.31. The angled corner gusset formations 100.31 of FIG. 13 is shown in rear view in FIG. 24, where there is illustrated the rear face of the gusset formation, being that face which will engage the post or corner of the container. It can be seen that the gusset formation 100.31 has three sides, being two generally triangular sides comprising a large outboard triangular side 100.315 and a smaller inboard triangular side 100.316, and a joining side 100.317 which is angled to both the horizontal and vertical planes. This gusset formation can be formed by fabrication and welding of three appropriately shaped sides or by cutting at appropriate angles, a square or rectangular hollow section and bending the sides to the appropriate shape or alternatively they can be formed from a flat sheet metal piece, and bent into the shape required.

The outside of the corner construction can have reinforcing in the form of welded flat plates 100.32 and 100.33 which are welded onto the outside of the container on the top rail of the side 102 as illustrated in FIG. 13, and also along the top rail of the shorter side of the container. The plate 100.33 is a generally square plate and is welded to the corner post below the ISO corner fitting 100.2, while the plate 100.32 is a generally rectangular plate which is welded to the top rail of the sides.

These ISO corner fitting reinforcements can assist in the fittings bearing the rotational loads which may be applied to them during tippler and discharge operations. While the ISO corner fitting reinforcements described above are welded structures, it is also possible to cast the ISO corner fittings together with these reinforcements so that an integrally formed corner and reinforcement is provided.

Figures 22, 23, 24, 25:
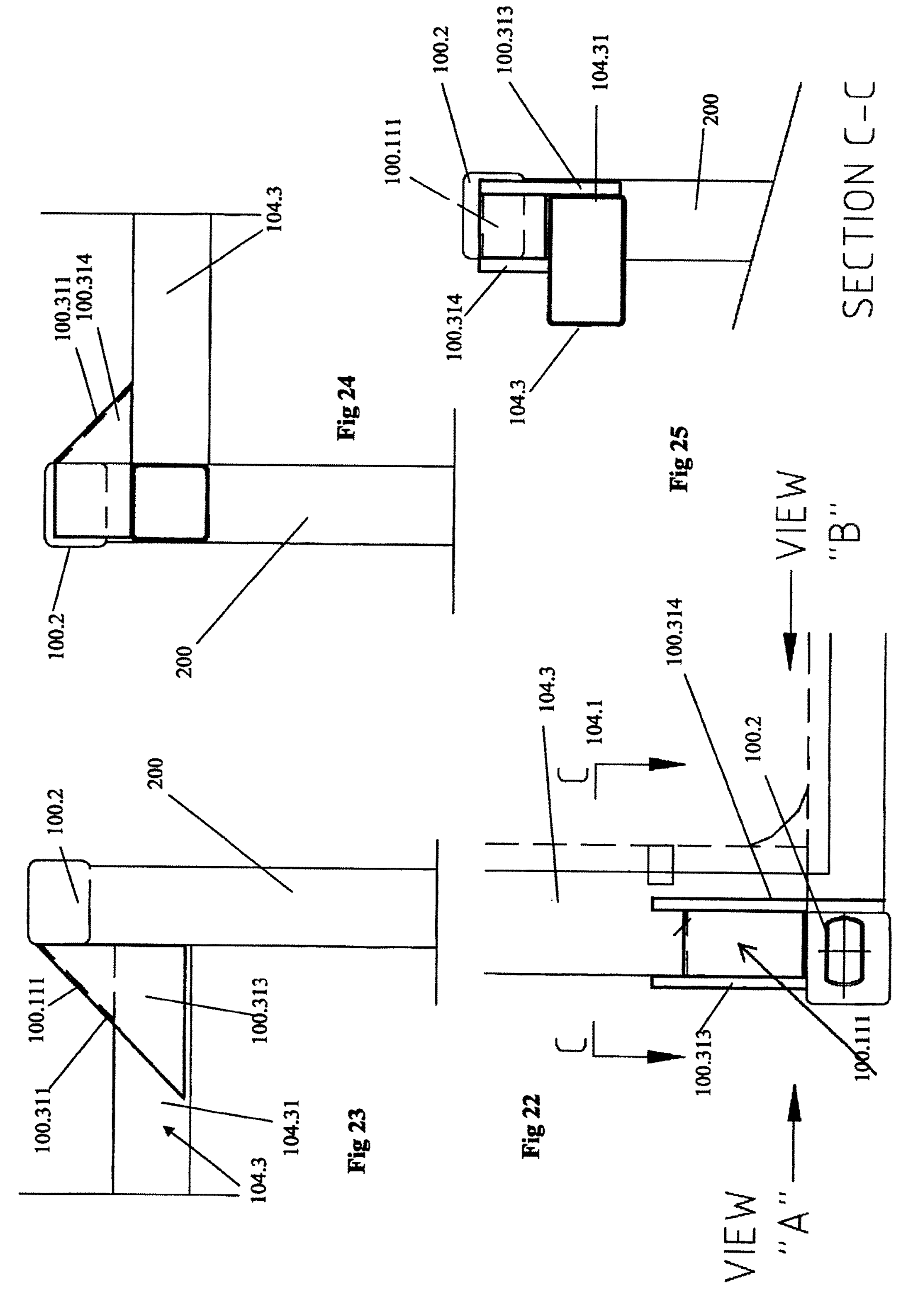
FIG. 22 illustrates plan view of a gusset formation as used with the container of FIGS. 16 and 17.
FIG. 23 illustrates an outside, side view of the gusset formation of FIG. 22 in the direction of arrow marked view A.
FIG. 24 illustrates an inside, side view of the gusset formation of FIG. 22 in the direction of arrow marked view B.
FIG. 25 illustrates a cross sectional view of the gusset formation of FIG. 22.
Figure 26:
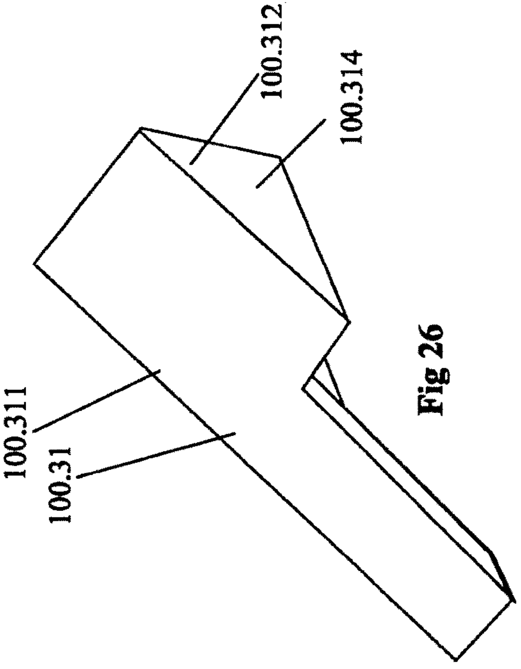
FIG. 26 is a side perspective view of a gusset formation for use with the container of FIGS. 16 and 17.
Figure 28:
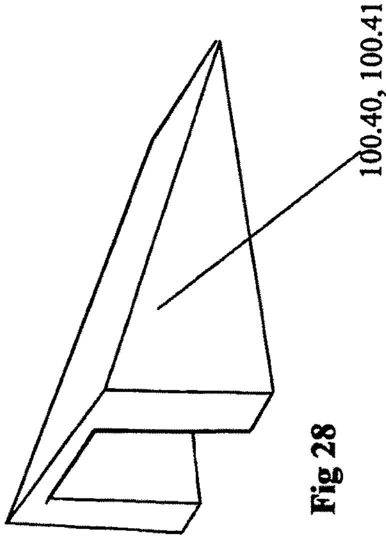
FIG. 28 is a rear front view of the lower gusset formations of FIGS. 16 to 29.
Figure 30:
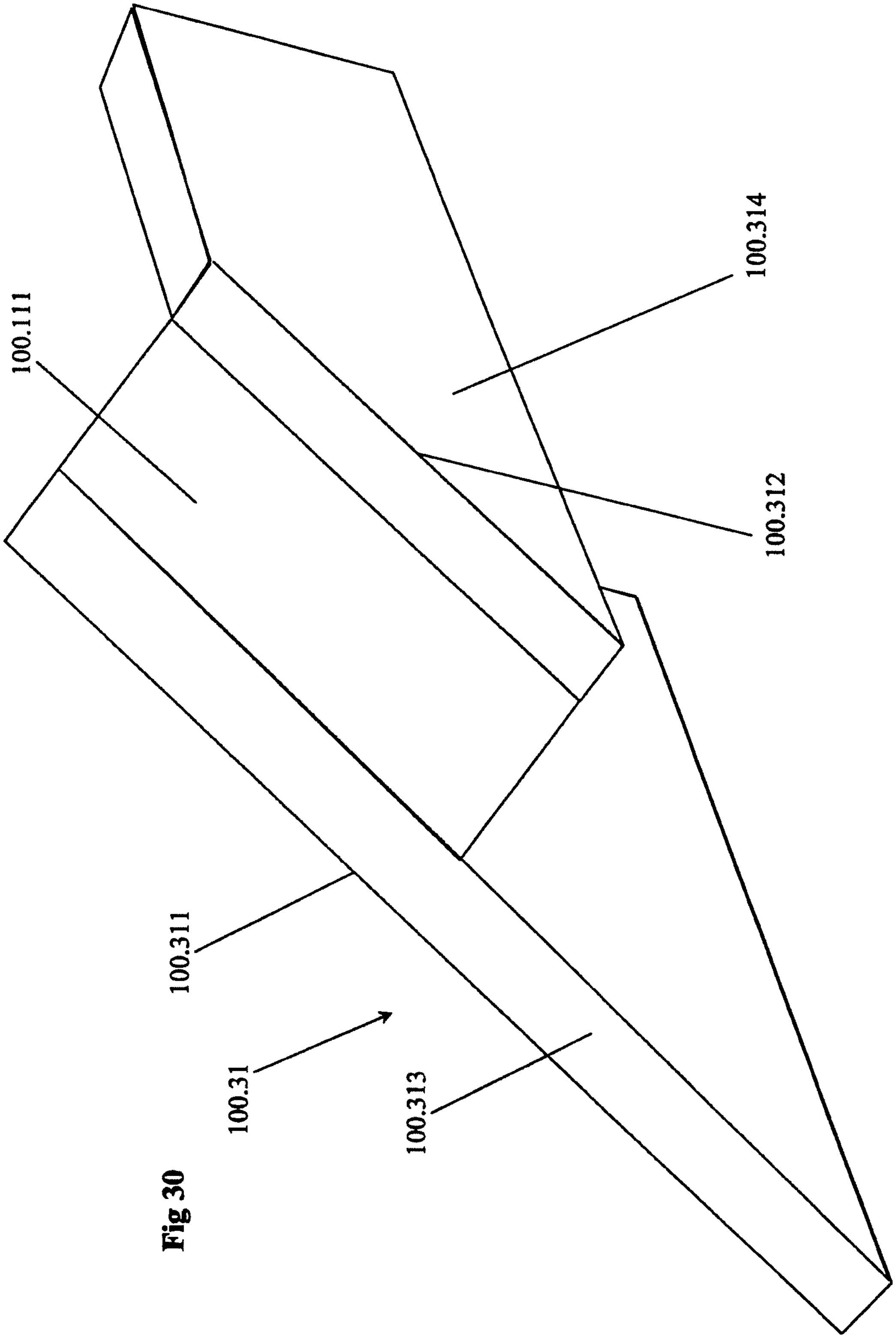
FIG. 30 is an upper side perspective view of the gusset formation of FIGS. 22 to 25.

As is best illustrated in FIGS. 16, 17 and 25 the upper corners 100.2 of the container have ISO fittings. Extending from the corner 100.2 at the end of the container in a downwardly and laterally extending direction (relative to the longitudinal axis of the container) towards the corner post on the opposite end, is a gusset formation 100.31. The gusset formation 100.31, can be formed by one of several methods and can be like that illustrated in greater detail in FIGS. 26 and 27, or FIGS. 22 to 25 and 30. In these figures it can be seen that the gusset formation 100.31 can have a generally triangular shape, with a long sloping edge 100.311 on an outboard triangular side 100.313 and a short sloping edge 100.312 on an inboard side 100.314. In the case of FIGS. 16, 17, 22 to 25 and 30, the short sloping edge 100.312 is on a trapezoid shaped component, whereas in the case of FIGS. 26 and 27, short sloping edge 100.312 is on a triangular shaped component. The edge 100.312, and the surface of the gusset formation associated therewith, terminates at the upper surface of end beam 104.3. Meanwhile, the long edge 100.311, and the surfaces of the gusset formation associated with it, terminate along the front face 104.31 of beam 104.3 and extends down to the base of the face 104.31. The generally triangular shape of the gusset formation 100.31 is welded where the shape of this gusset formation intersects with the beam 104.3 and the corner 100.2 and the post 200.

Figure 27:
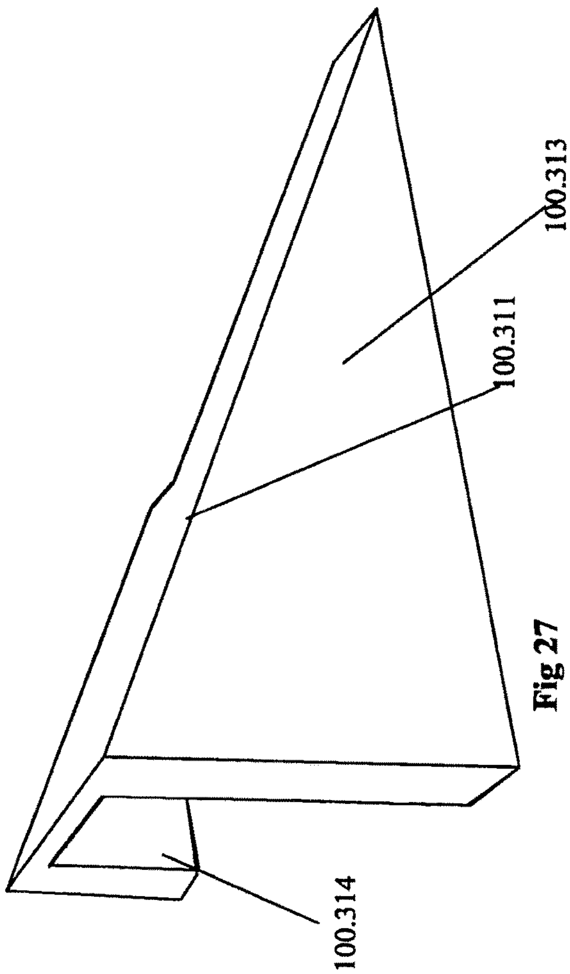
FIG. 27 is rear front side perspective of the gusset formation of FIG. 30.
Figure 29:
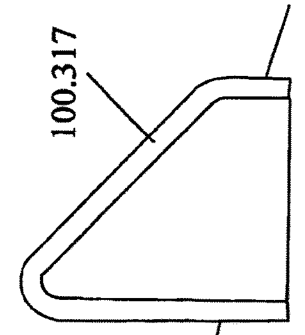
FIG. 29 is a side view of the gusset formation of FIG. 13.

As can be seen from FIG. 27, the gusset formation 100.31 has at its rear side a generally U-shaped configuration, where the leg of the U-shape which corresponds to the triangular side 100.313 is greater in length than the triangular side 100.314.

The inwardly extending gusset formations 100.31 of FIGS. 16 to 31 are located at each of the four upper corners 100.2 and it will be noted that these extend inwardly along the line of the upper rim of the sides 104.1 and 102.1. The gusset formation 100.31 could be generally described as having a generally triangular shape with a portion having been truncated therefrom so as to form the shorter edge 100.312 to accommodate the beam 104.3. The gusset formation 100.31 is preferably formed from sections of shaped or bent steel which have been appropriately cut so as to be able to provide a weld location.

Figure 32:
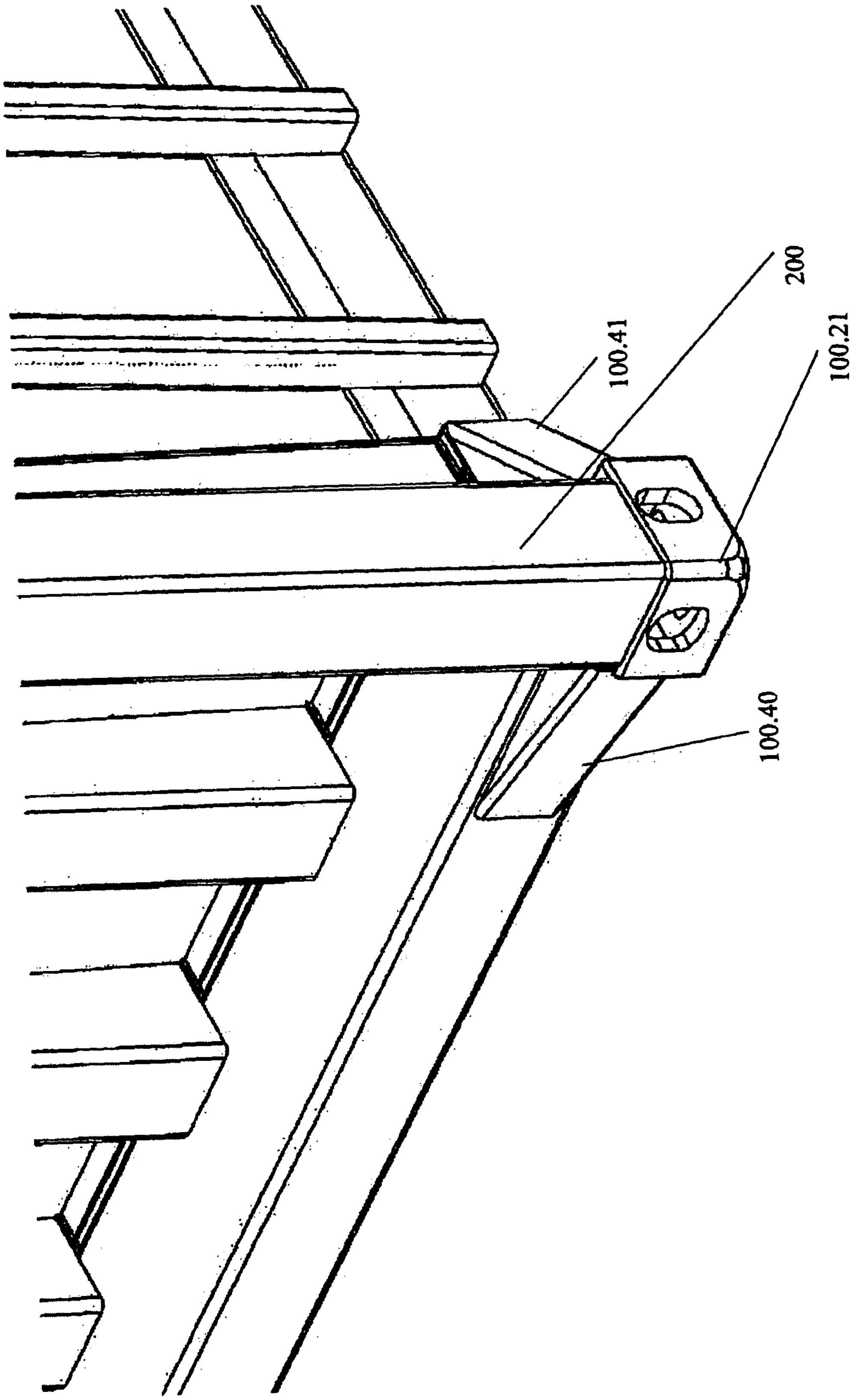
FIG. 32 illustrates a detailed perspective view of a lower corner of the container of FIGS. 16 and 17.

As will be noted in FIGS. 16, 17 and 32, the lower corners 100.21 and 100.22 each have two regular triangular or prism like gusset formation 100.40, 100.41. The gusset formation 100.40 extends laterally (relative to the longitudinal axis of the container) along the face of the end and is welded to the lower beam 104.32. Whereas the gusset formations 100.41 extend longitudinally from the lower corners 100.21 towards the opposite end of the container along the longitudinal side. The gusset formations 100.40 and 100.41 are illustrated in a rear perspective view in FIG. 28 and they have a generally U-shaped configuration from the rear, where the legs of the U are of approximately equal length. Like the gusset formation 100.31 of other figures, the gusset formations 100.40, 100.41 are formed of two triangular sides and a rectangular joining piece. These can be formed by fabrication or by cutting at appropriate angles, a square or rectangular hollow section or alternatively they can be formed from a flat sheet metal piece, and bent into the shape required.

Illustrated in FIGS. 22 to 25 and 30, is an example of a gusset formation as used on the corners of the container 1100 of FIGS. 16 and 17. The gusset formation 100.31 is formed from a triangular outboard side 100.313, which is cut from steel plate having a thickness of approximately 20 mm, and is welded to the inboard side of corner 100.2 and post 200, also to the front surface of beam 104.3, and to the cross piece 100.111. The inboard side plate 100.314 is also made from steel plate of approximately 20 mm in thickness and has a generally trapezoid shape and is welded to the top of beam 104.3, cross pieces 100.111 and the sides of corner 100.2 and post 200.

As is best viewed in FIGS. 22, 25 and 16, it can be seen that the location of beams 104.3 and 104.4 is that they do not sit within the dimensions or width of the post 200 and the corners 100.2. This makes the inboard edge or side of the beam 104.3 provide an upper rim and the front and rear ends of the container 1100, which is inset from the posts 200 and corners 100.2. This inset provides the container 1100 with the ability to be engaged by a tippler apparatus 31.330 as illustrated in FIG. 31, so that when the container 1100 is inverted, i.e. rotated through 180 degrees, the structure 31.333 of the tippler which engages the corners 100.2 to the container 1100, as illustrated in FIG. 31, will not be contacted by the contents of the container as these contents fall out of the container. Further, as the gussets extend along the end rails laterally of the longitudinal axis, the contents which pour over the longitudinal rails, will not fall onto the corner castings, gussets or fitting, thus ensuring all contents get delivered and not inadvertently caught up or lodged onto the container or the tippler structure. The tippler apparatus is described in more detail herein.

The inboard edge or surface of the lower beam 104.4 is located a further distance from the corner 100.2 or post 200 by a greater distance than is the inboard edge or surface of the upper beam 104.3. This difference in distance of extension into the confines of the container, provides the 2 degrees of taper on the end walls 104.1 and 102.1, as is evidenced by the tapered structure of the vertical ribs on the front end 102.1 in FIG. 16.

Figure 33:
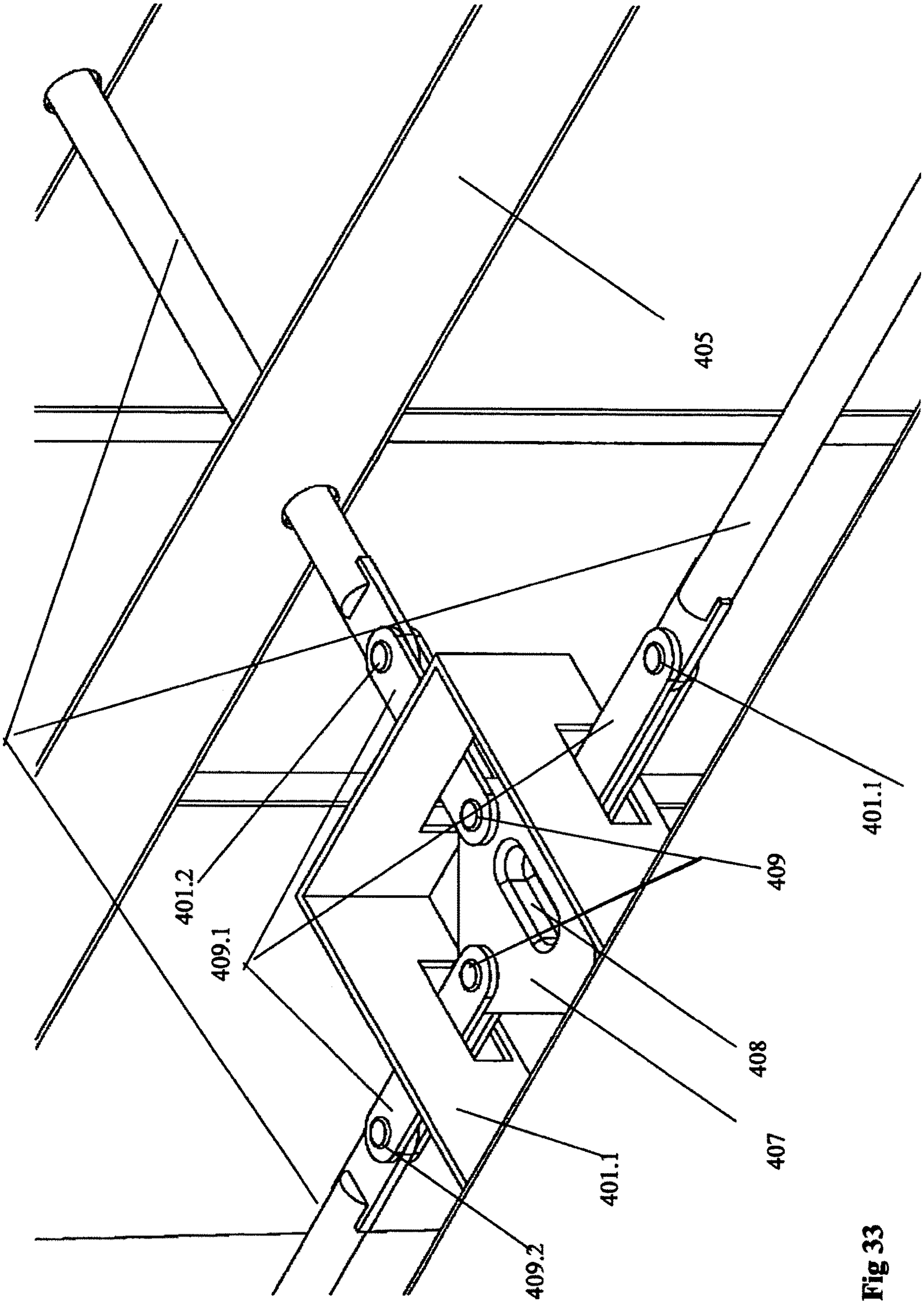
FIG. 33 illustrates a detailed perspective view of the locking and unlocking mechanism of the lid of FIGS. 18 to 21.

Illustrated in FIGS. 18 to 21, are various views of a lid 400 for use with the container 1100 of FIGS. 16 and 17. The lid 400 includes two centre located lock formations 401, into which can be received lift members, such as lifting hooks or the twist lock mechanisms, associated with the lid lifting means on a tippler, as described below. The formations 401 include a housing 401.1 in which is rotatably located a plate 407 which will receive in an obround aperture 408 the twist lock members of a lid lifter. As is illustrated in FIG. 33, three locations on the rotatable plate 407 have a pin connection 409 to respective pivoting links 409.1 which in turn are pivotally connected to locking rods 402 by pins 409.2. The rods 402 radiate out from the formations 401 to engage apertured locking plates 403 on the end and side rims of the container at respective ends of the container as is illustrated in FIGS. 16 and 21. By the action of twist locks locking onto the formations 401 and engaging apertures 408, the lid lifting device will rotate the twist lock in a first direction thereby moving the locking rods 402 to an unlocked condition, and because the twist locks have engaged formation 401, the lid is unlocked and can be lifted off the container. Whereas rotation in a direction to disengage the twist locks from the formations 401, will cause the lock rods to move to a locked condition on the container, whereby the lid is locked onto the container and the lid lifting device can move to the next container.

Figure 18:
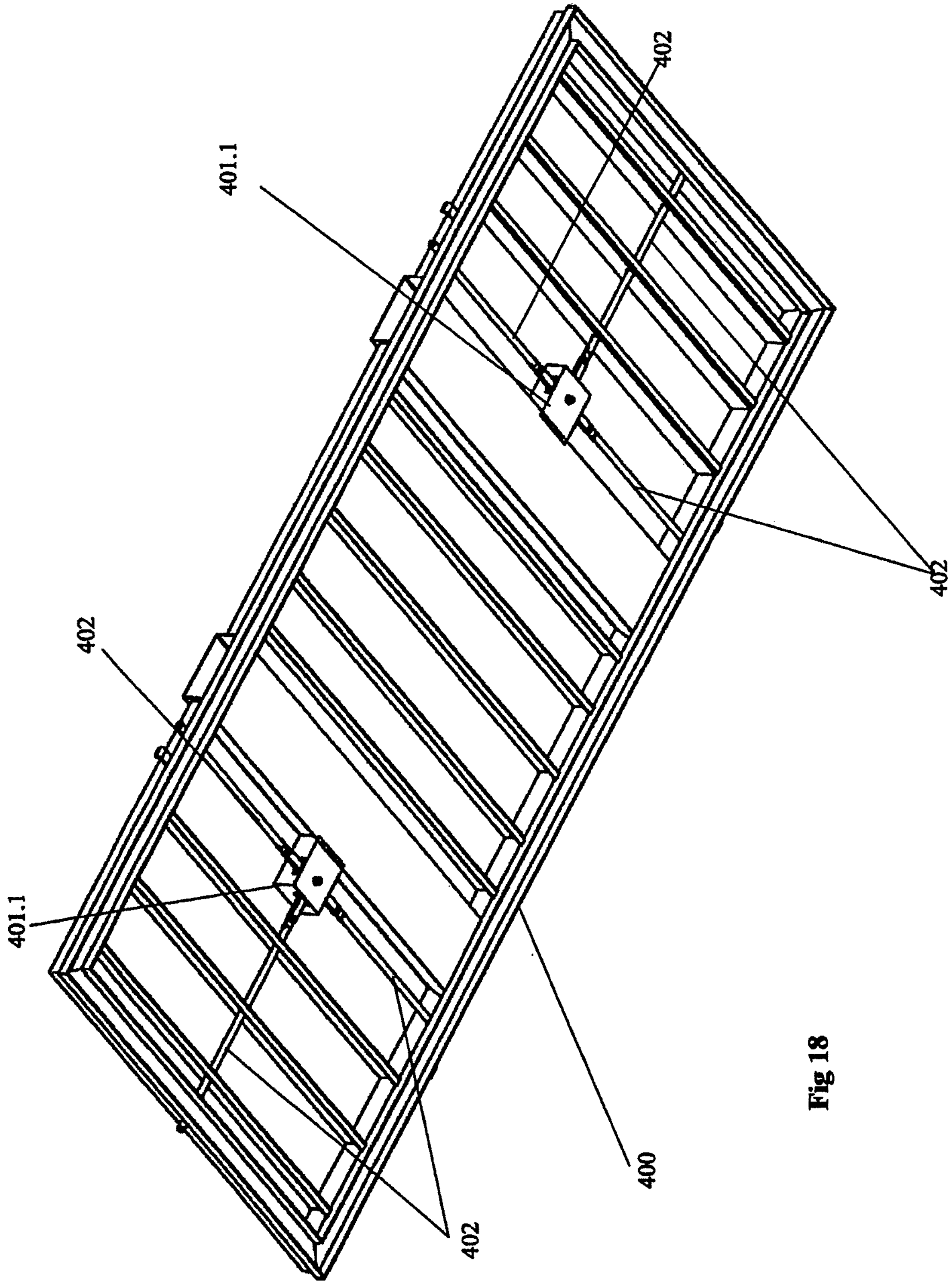
FIG. 18 is an underneath perspective view of a lid for use with container of FIG. 16
Figure 19:
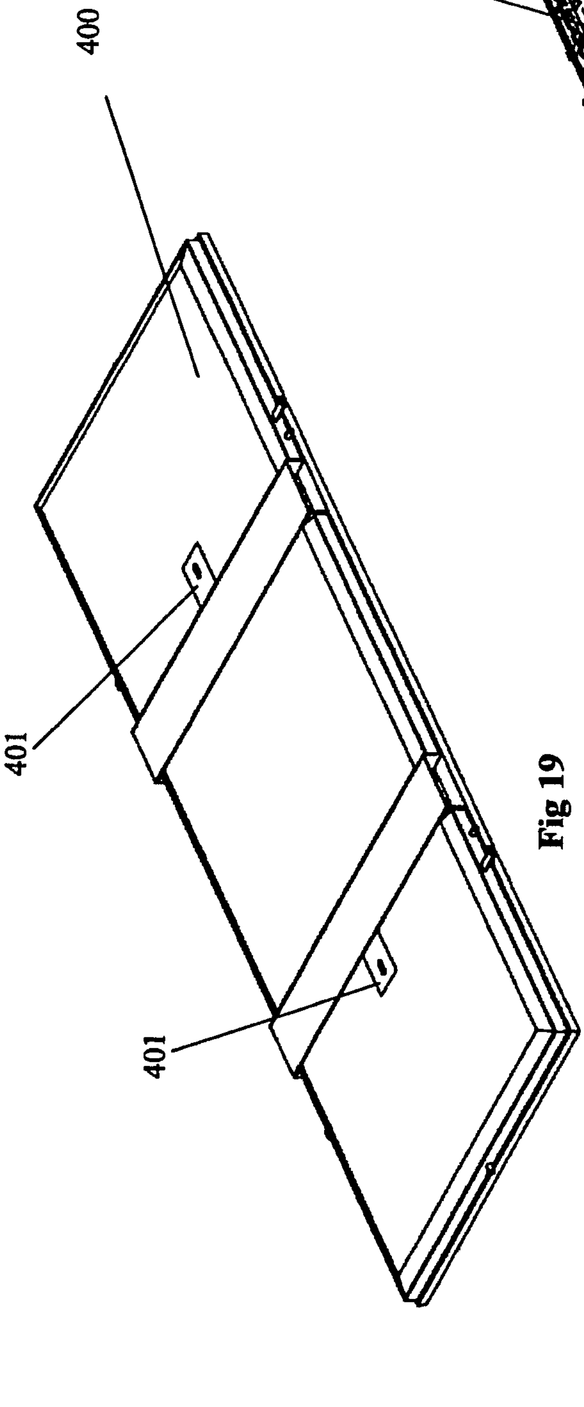
FIG. 19 illustrates an upper perspective view of the lid of FIG. 18
Figure 20:
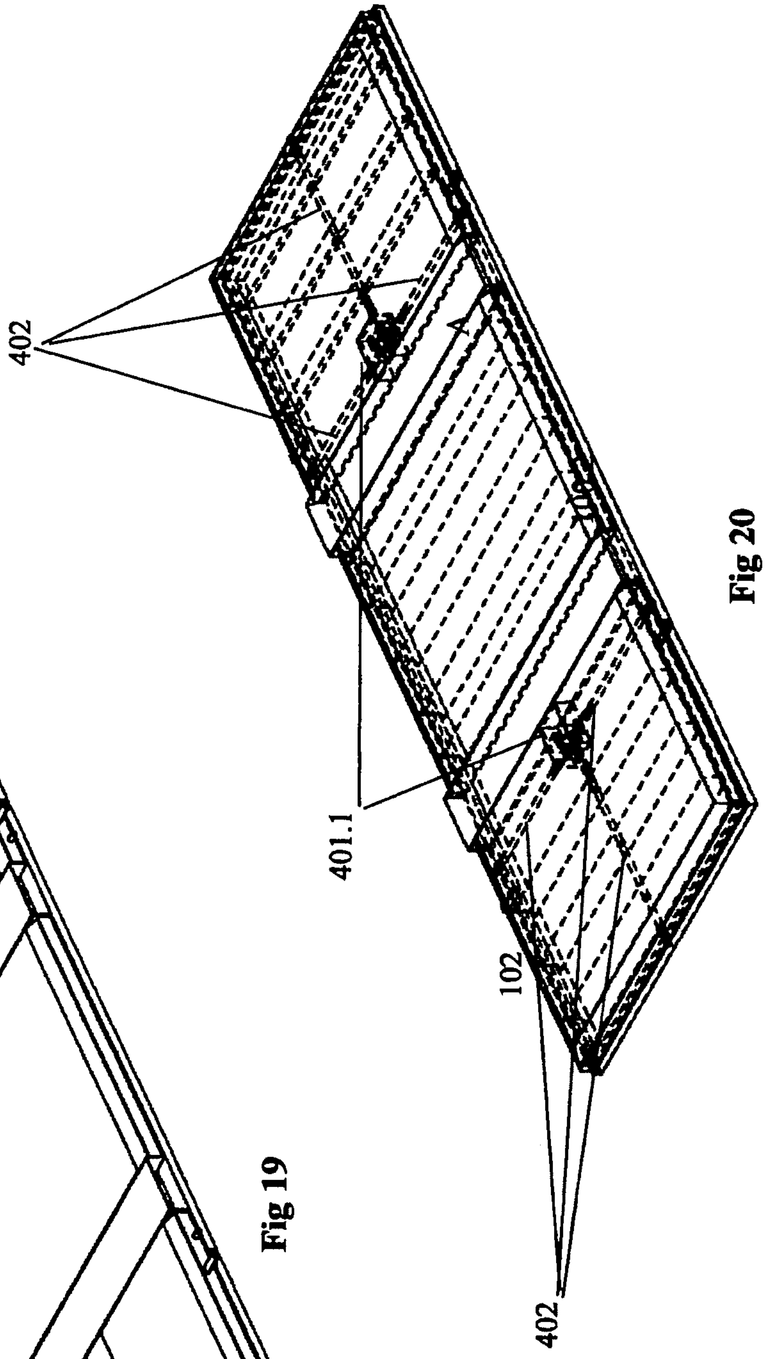
FIG. 20 illustrates a perspective view of the lid of FIGS. 18 and 19 showing hidden details.

As is visible in FIGS. 18 and 21, the lid 400 includes lateral beams 405 through which the longitudinally oriented lock rods 402 pass in the forward and rearward directions.

The lateral beams 405 help support the sheet metal (removed for purpose of illustration in FIG. 21) of the lid 400. Additional lockdown locks 406 can also be provided so that after the container is filled, the lid 400 can be secured by padlocks or the like, to prevent unauthorised access to the container or unlocking of the lid 400 from the container. Further, such lockdown locks 406 also provide a manually operated lid securing system if needed. Also as the lockdown locks 406 are operated from the side of the container which does not require operators to climb on top of the lid.

As illustrated in FIGS. 16 and 17 the upper corners 100.2 can have directly below them, on the containers long sides, an L-shaped flat reinforcing plate (similar to plate 100.32 of FIG. 13) with the L-shaped reinforcing plate 100.321 helping to brace, by means of a relatively low profile the upper beam to the post and corner of the container.

Figure 34:
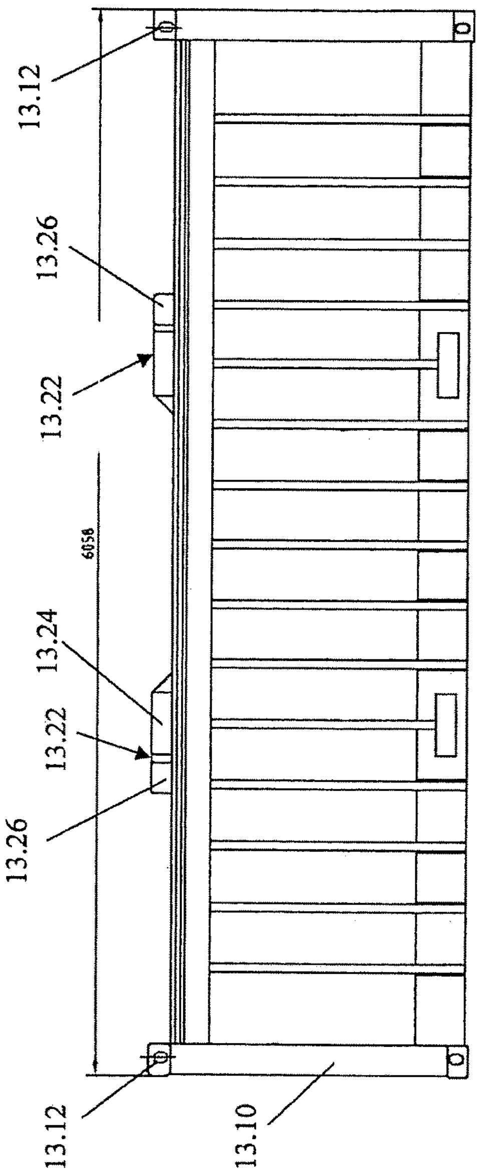
FIG. 34 is front elevation of an open container with a lid.
Figure 35:
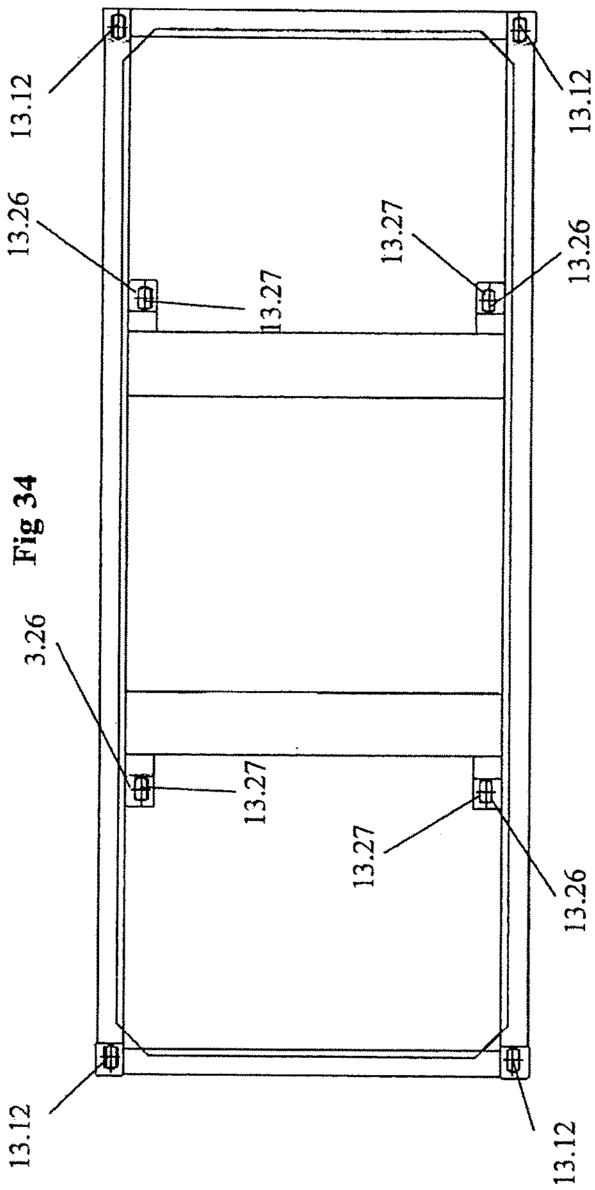
FIG. 35 is a plan view of the container and lid of FIG. 34.
Figure 36:
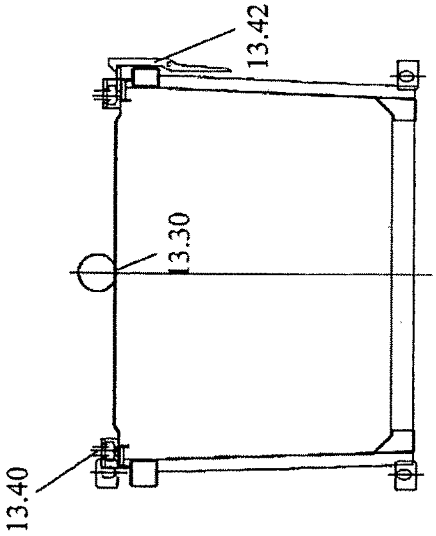
FIG. 36 is a side cross section of the container and lid of FIG. 34.

Illustrated in FIGS. 34 to 36 is an open container 13.12 having four ISO fittings at its upper corners allowing the container to be lifted by a crane which will have similarly located twist locks so as to lock onto the container 13.10.

Covering the opening of the container 13.10 is a lid 13.20 which has two lifting systems thereon. The first are two lateral channels 13.24 into which tynes of a fork lift can be received so as to lift or position the lid 13.20, if required.

The second system is four spaced aperture formations 13.26 attached to the lid 13.20. The aperture formations are located close to the tyne channels 13.24. The aperture formations 13.26 are generally box shaped like an ISO fitting and have an obround aperture 13.27 in them as is illustrated in FIG. 35. The lid 13.20 substantially covers the opening of the container 13.10, as can be seen at the corners a small opening is apparent and this opening allows for ventilation as well as an observation hole through which handlers can check the contents of the closed container 13.10.

Figure 37:
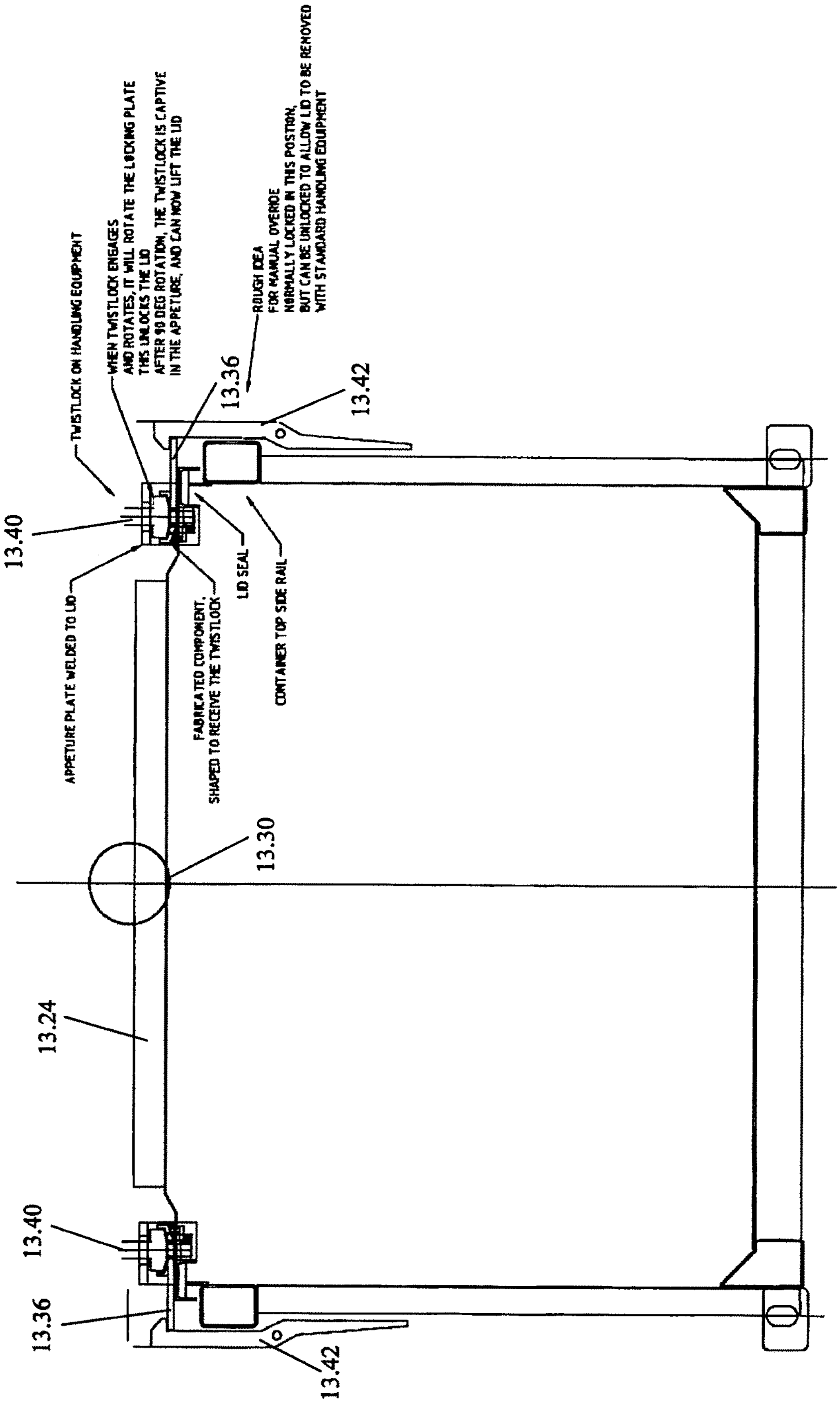
FIG. 37 illustrates the cross section of FIG. 36 in more detail showing a mechanism to release a lock which locks the lid to the container by the insertion of a twist lock.
Figure 39:
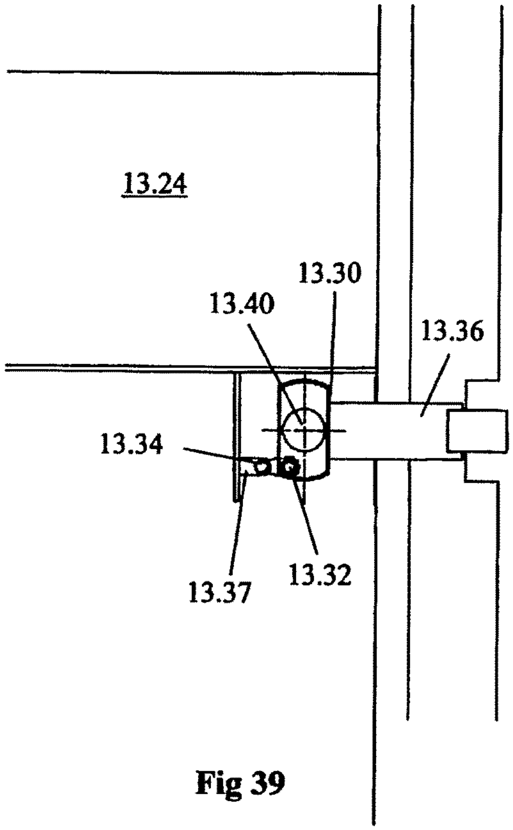
FIG. 39 illustrates a plan view of the features of FIG. 38.
Figure 39A:
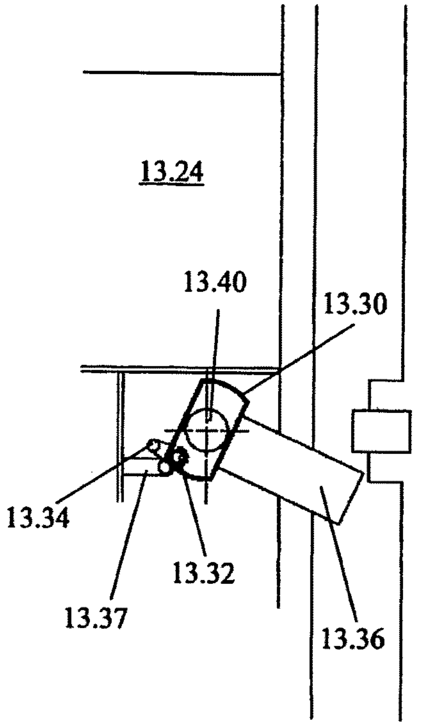
FIG. 39A is similar to FIG. 39 with the casting and striker plate rotated so striker plate is not in engagement with a latch.
Figure 38:
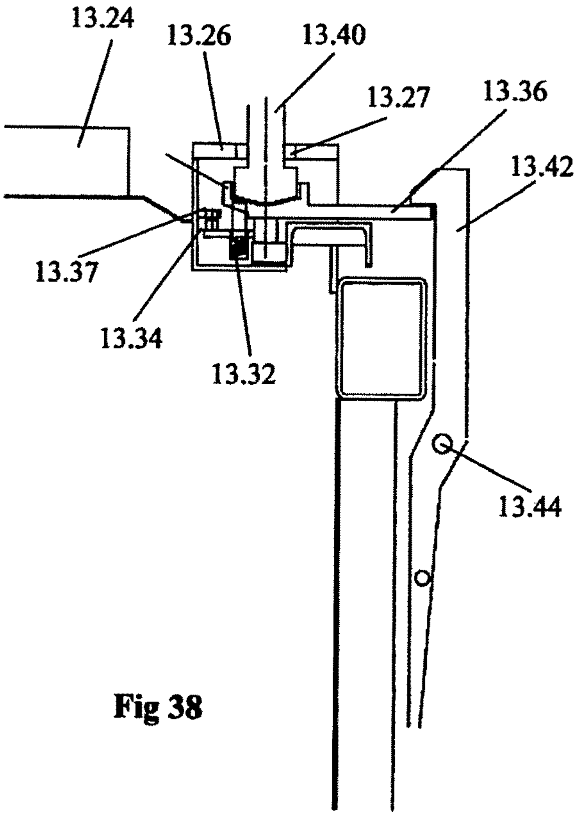
FIG. 38 illustrates a side portion of FIG. 37 in more detail.

The side sectional views of FIGS. 37 and 38, and plan view of FIGS. 39 and 39A illustrate in more detail the locking arrangement. The lock arrangement has a rotating striker plate 13.36 which is attached to or integrally formed with a casting 13.30 located in the aperture formation 13.24. A twist lock 13.40, mounted on a lifting means, can enter through the obround aperture 13.27. With the casting 13.30, which has a longitudinal axis like the twist lock 13.40 and the obround hole 13.27, all longitudinal axes being oriented in the same orientation, that is parallel to the longitudinal axis of the container, then the twist lock 13.40 can be inserted through the hole 13.27 and into casting 13.30. At this point in time, the striker plate 13.36 would be in the locked conditions of FIG. 39 and FIG. 38. By the twist lock 13.40 being rotated 90 degrees, in a clock wise direction relative to FIG. 39, as seen in FIG. 39A, the striker plate 13.36 will rotate through 90 degrees as well as the casting 13.30. The twist lock can be rotated through 90 degrees by hydraulic or other means, or could be rotated by semi-automatic twist lock mechanisms which rotate by themselves when forced to engage obround apertures in ISO fittings.

In FIGS. 38, 39 and 39A it can be seen that the container has a biased latch 13.42, which pivots around pivoting mounting 13.44. The end of the striker plate 13.36 is caught under an overhang of the latch 13.42. If desired to be manually released, the operator can simply rotate the lower section of the lever of the latch 13.42 towards the container 13.10, and this will allow the end of the striker plate 13.36 to be cleared for upward movement past the overhang of latch 13.42.

The rotation of the twist lock 13.40 to the direction it is shown in between FIGS. 39 and 39A, would mean the striker plate 13.36 is disengaged from the latch 13.42, and at the same time the twist lock 13.40 will be locked into the aperture formation 13.26, allowing retraction of the twist lock 13.40 thus lifting the lid from the container.

Due to the vibrations encountered during transport, the casting 13.30 can be provided, as illustrated in FIGS. 38, 39 and 39A, with biased pin 13.32 which is mounted for movement with the casting 13.30. The biased pin 13.32 engages a side offset pin 13.34, which is able to pass through a hole in a stationary lock member 13.37 which is attached to the inside of the aperture formation 13.26. Thus, with the casting 13.30 and the striker plate 13.36 in the locked condition of FIGS. 38 and 39, and no twist lock 13.40 located in the casting 13.30, the upper portion of pin 13.32 will protrude into the cavity of the casting 13.30. In this condition the side pin 13.34 is also located in the hole in the stationary lock member 13.37, which will prevent accidental rotation of the striker plate 13.36 during transport or due to vibration. By the insertion of the twist lock 13.40 into the casting 13.30, the pin 13.32 is moved against its bias, in this case a spring, and the side pin 13.34 is simultaneously moved out of engagement with the hole in the lock member 13.37. At this point the pin 13.32, the casting 13.30 and striker plate 13.36 are all free to rotate when the twist lock 13.40 is rotated to its locked condition. Thus by connecting up the twist locks 13.40, the lid 13.20 is also simultaneously unlocked from the container 13.10.

By biasing the rotation of the casting 13.30, and if a member extended from the casting 13.30 into the tyne or fork lift channel 13.24, the action of inserting a fork lift tyne into the channel 13.24 can be made to unlock the lid from the container. However, a member which works in one direction and a second member which works in another direction might be required to achieve this.

Figure 40:
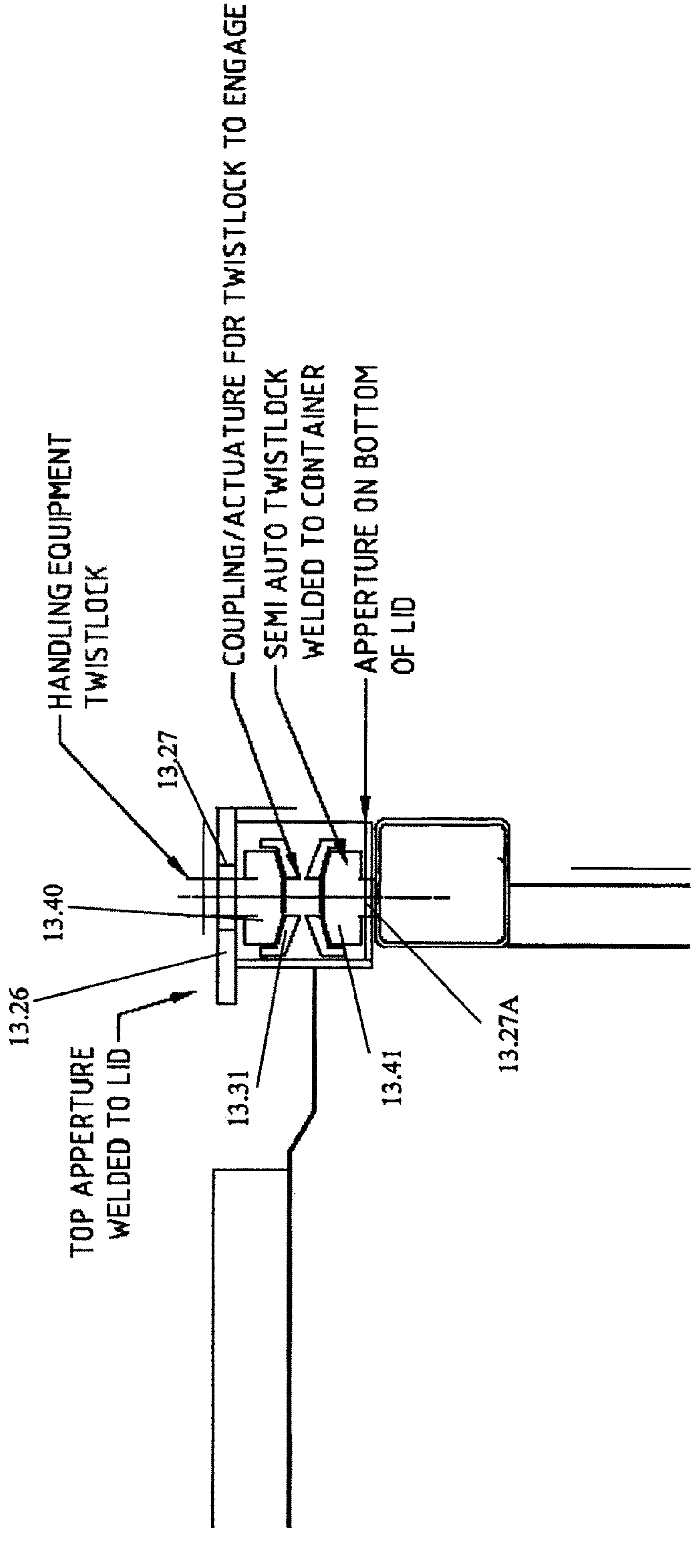
FIG. 40 illustrates a schematic cross section through a lid a lock means as an alternative to the locks of FIGS. 37 to 39.
Figure 41:
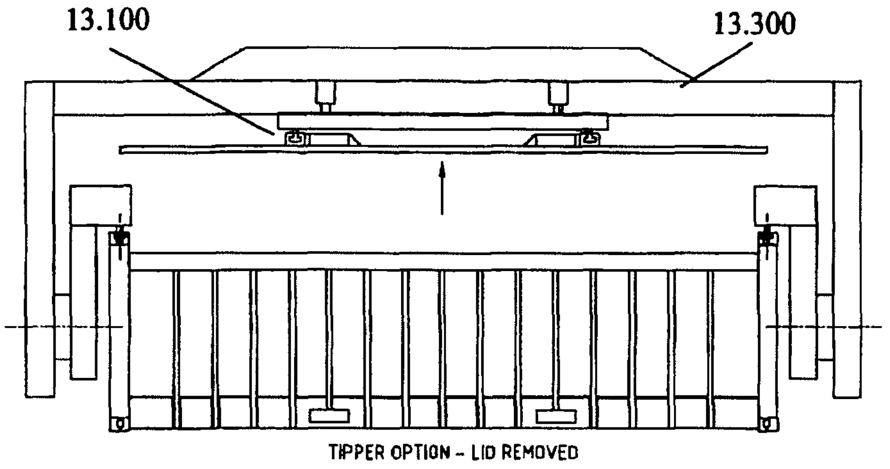
FIG. 41 illustrates a front elevation of a container and lid in a combined tippler and lid lifter showing a lid lifting stage.
Figure 42:
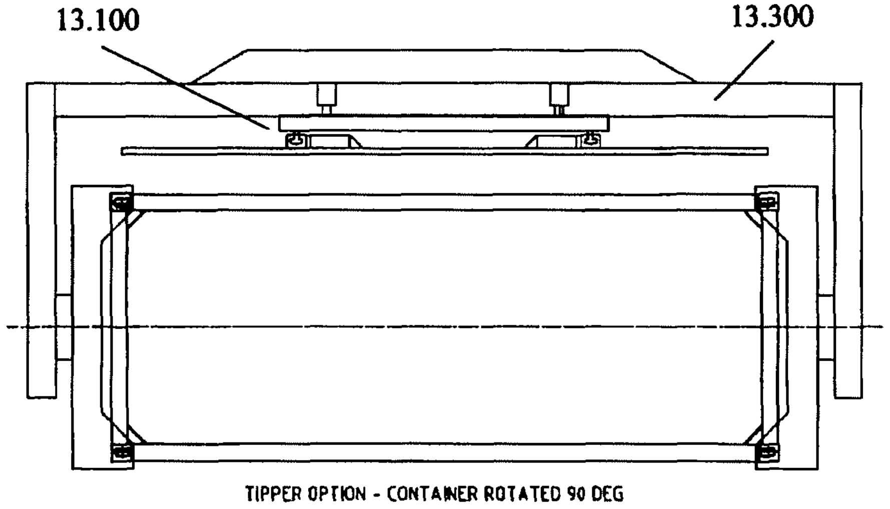
FIG. 42 is similar to that of FIG. 41 with the lid lifter out of the rotation envelope of the container with the container having been rotated through 90 degrees.
Figure 43:
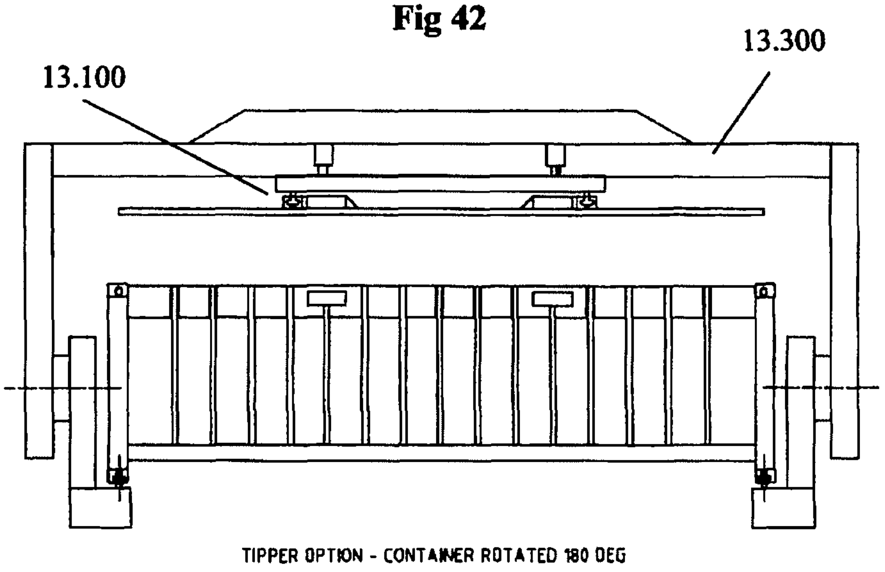
FIG. 43 is similar to FIG. 42 with the container rotated through 180 degrees.
Figure 44:
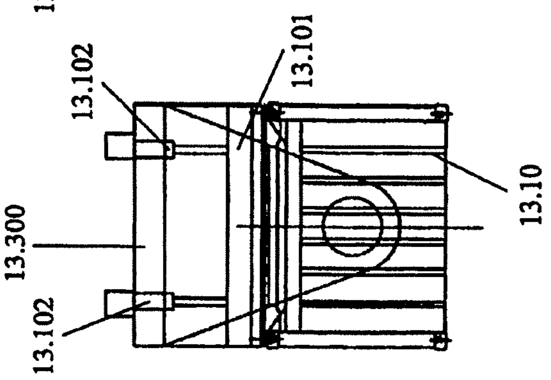
FIGS. 44 to 47 are side views of the stages of FIGS. 41 to 43.
Figure 45:
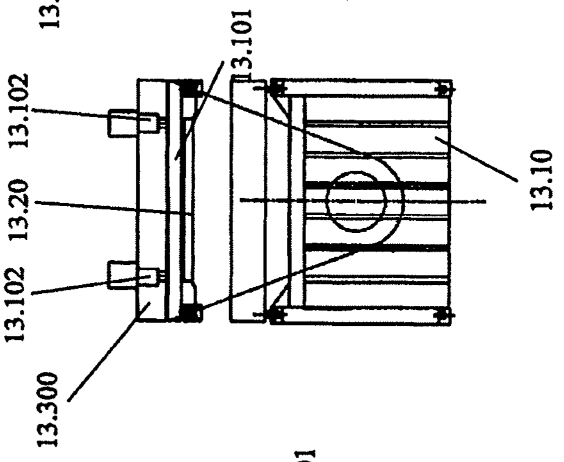

Illustrated in FIG. 40 is an alternative lock mechanism to that of FIGS. 37, 38, 39, and 39A. In the lock mechanism of FIG. 40, an aperture formation 13.26 is provided on the lid 13.20, with an aperture 13.27 in the top of the formation 13.26, and an aperture 13.27A in the under surface of the formation 13.26. Further on the container rim, is positioned or welded a semi-auto twist lock 13.41, so that with the twist lock 13.41 and obround hole 13.27A have their longitudinal axes aligned, the downward motion of the lid 13.20, relative to the container 13.10, will mean that the lid 13.20 will be automatically locked to the container 13.10 because the twist lock 13.41 will have rotated to the locked condition. Inside the formation 13.26 is dual sided casting 13.31, with the upper twist lock receiver being at approx 90 degrees to the lower twist lock receiver. When the lid is positioned onto the container, the upper casting will be forced to rotate to release the twist lock 13.40, due to the force provided by the twist lock 13.41 rotating the lower portion of the casting 13.31. Thus simultaneously as the lid is locked into position, the twist lock 13.40 is rotated to the release position. And as soon as the twist lock 13.40 reengages the upper portion of casting 13.31, and is rotated to the locked condition the lower portion of casting 13.31 will rotate twist lock 13.41 to the unlocked condition allowing the lid 13.20 to be lifted from the container 13.10.

Illustrated in FIGS. 48 to 51 and 53 is the container 13.10 and lid 13.20 described above with the twist locks 13.40 being mounted on a lid lifting mechanism which is in turn mounted to or constructed to be a part of a container lifting means 13.200. The outer ends of the container lifter 13.200 has twist locks 13.90 located in a downwardly extending condition so as to engage the obround holes in ISO fittings 13.12 on the upper corners of the container 13.10, as described above.

The twist locks 13.40 are located on a single lifting platen 13.101, which is translated relative to the frame of the container lifter 13.200 by means of hydraulic cylinders 13.102. Before, after or during the engagement of the twist locks 13.90 to the ISO Fittings 13.12, the cylinders 13.102 can be made to independently move the platen 13.101 towards or away from the lid 13.20 and the aperture formations 13.26.

Figure 48:
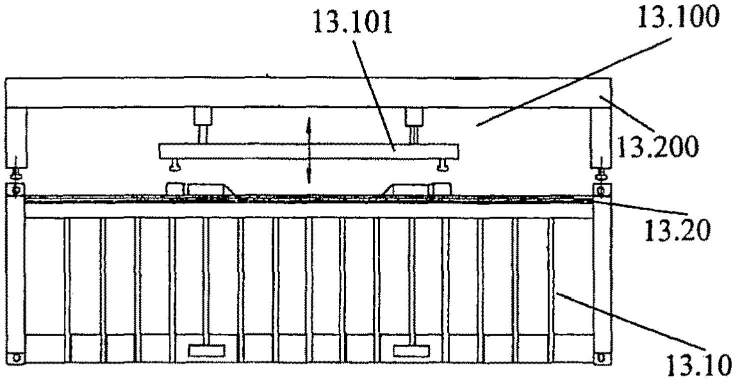
FIGS. 48 to 51 show the stages of the lid lifter engaging aperture formations on the lid and then lifting the lid.

As illustrated in FIGS. 48 to 51, in FIG. 48 the container lifter 13.200 is moved into position with the container 13.10, such that the lid lifting platen 13.101 can be moved independently.

Figure 49:
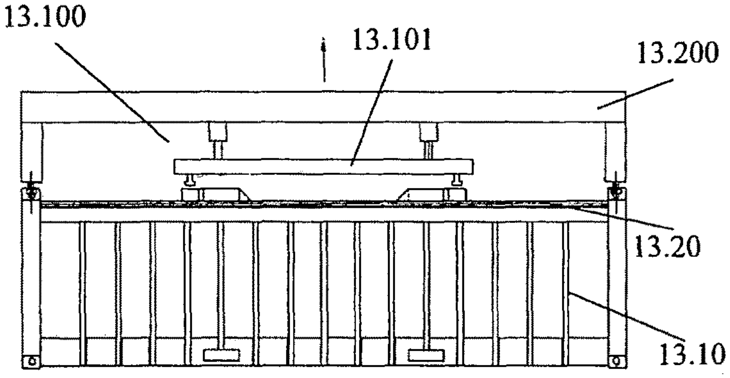
Figure 50:
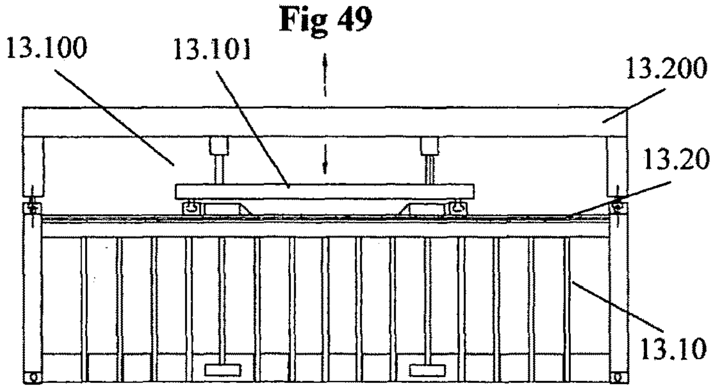
Figure 51:
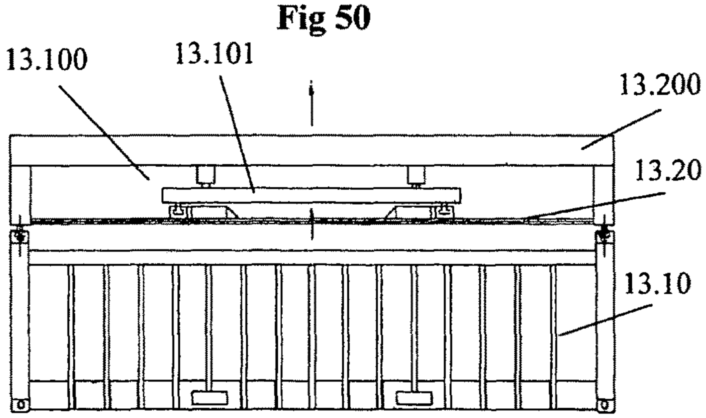

As in FIG. 49, the container can begin to be lifted, while at the same time the lid lift platen 13.101 is moved towards the lid 13.20, so that twist locks 13.40 can engage the aperture formations 13.26, as is illustrated in FIG. 50. As in FIG. 51 the lid 13.20 can be lifted by the retracting of the cylinders 13.102.

FIGS. 48 to 51 and 53 illustrate a rig which can be mounted to a crane, for moving containers and simultaneously lidding or unlidding them while the container is in motion.

Illustrated in FIGS. 41 to 43 and 44 to 47, is an example of the mounting of the lid lifter 13.100 to a tippler or container rotating lifter 13.300. The difference between the lifter 13.300 and 13.200 of the previously described figures is that the lifter 13.300 is able to invert a container 13.10 so as to discharge its contents at a desired location.

Figure 46:
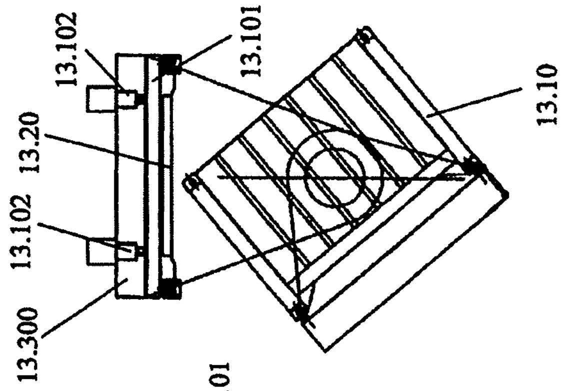
Figure 47:
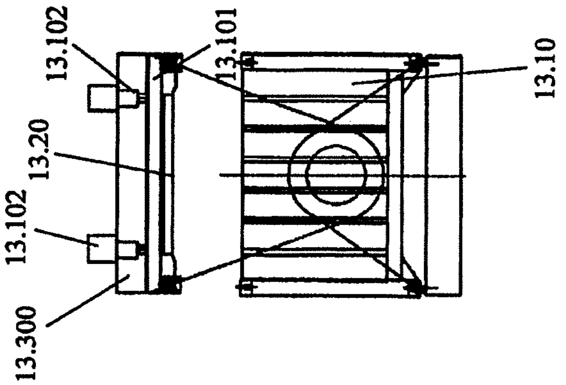
Figure 52:
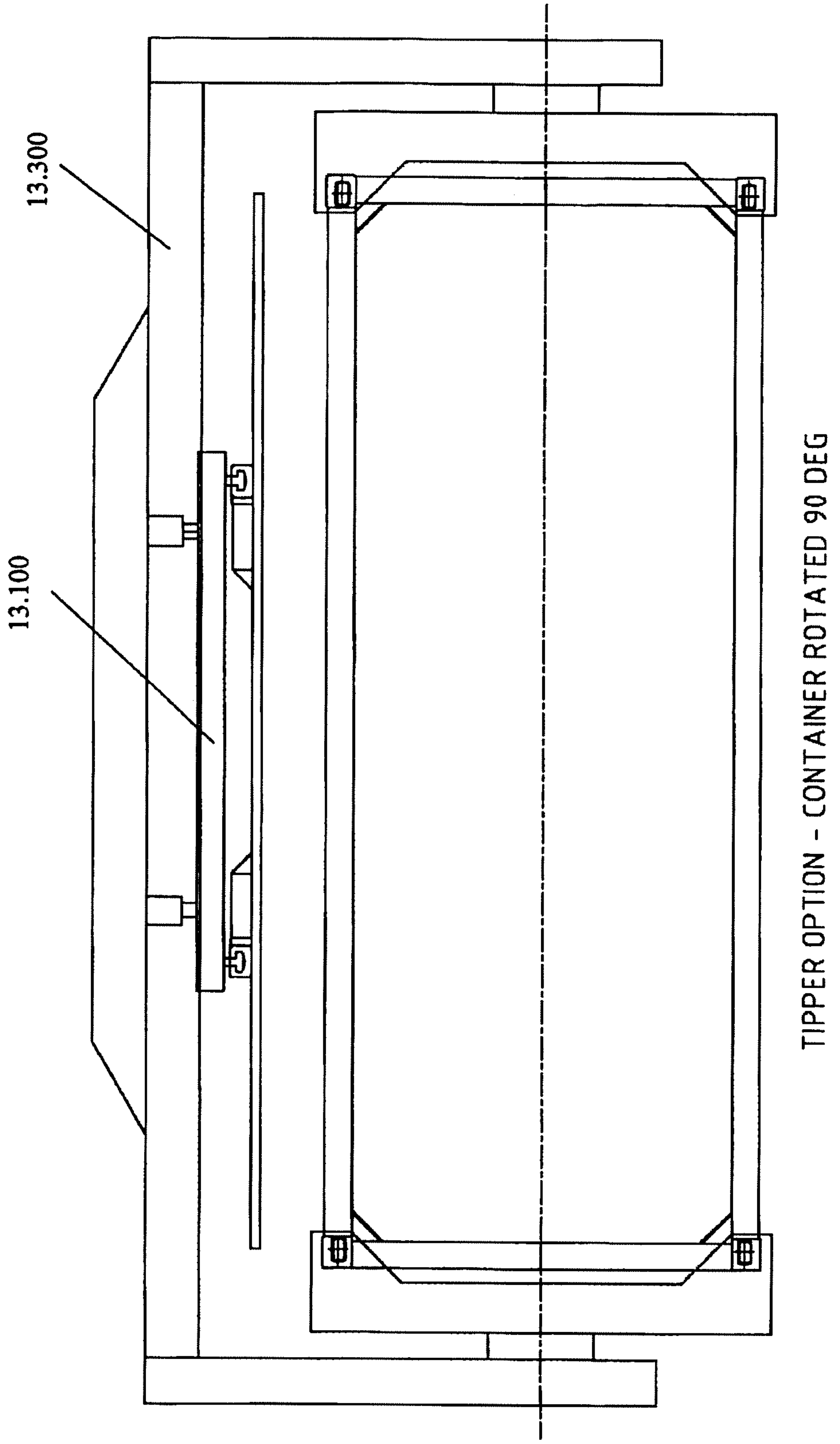
FIG. 52 shows FIG. 42 in more detail.
Figure 53:
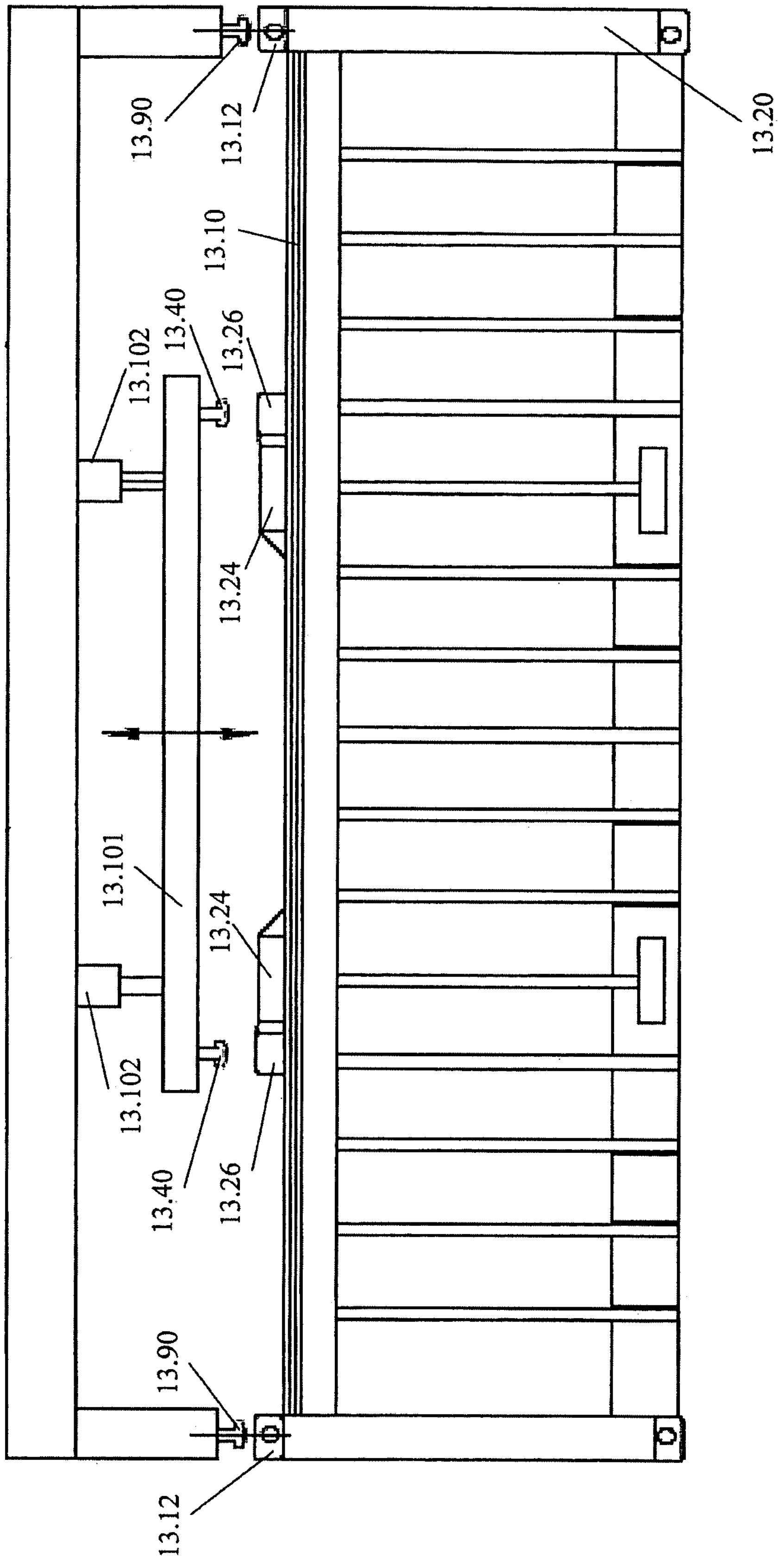
FIG. 53 shows FIG. 48 in more detail.

In the lifter 13.300 of FIGS. 41 to 47, the lid lifter 13.100 is similar to that described previously, except that as the container 13.10 is now to be rotated, the lid lifter 13.100 needs to lift the lid 13.20 so that it is clear of the rotation envelope of the container 13.10, as illustrated in FIGS. 46 and 52.

By the lifting systems 13.100, 13.200 and 13.300 it will be readily seen that a more time effective method of handling an open container can be achieved wherein the lifting device is controlled so as to lift the container and the lid, or lift the container and lift the lid from said container; or to lift just the lid from the container.

It will also be understood that the lifting of the container and the lid, or lifting the container and lifting the lid from the container, can be performed sequentially or in a more time effective manner this can be done simultaneously.

Prior to rotating the container as discussed above, the lid is lifted off the container and transported to a location, relative to the container, outside of a rotation envelope of the container.

While the above has twist locks 13.40 and 13.90 on relatively rigid frames and systems for mounting to complex installations, it will be understood that the twist locks could be cable mounted and made to be part of lifting frames and the like.

While the above described embodiment have 4 twist locks 13.40 and 4 aperture formations 13.26, it will be understood that the invention can be exercised with 1, 2, 3 or 4 sets of twist locks and aperture formations.

Figure 54:
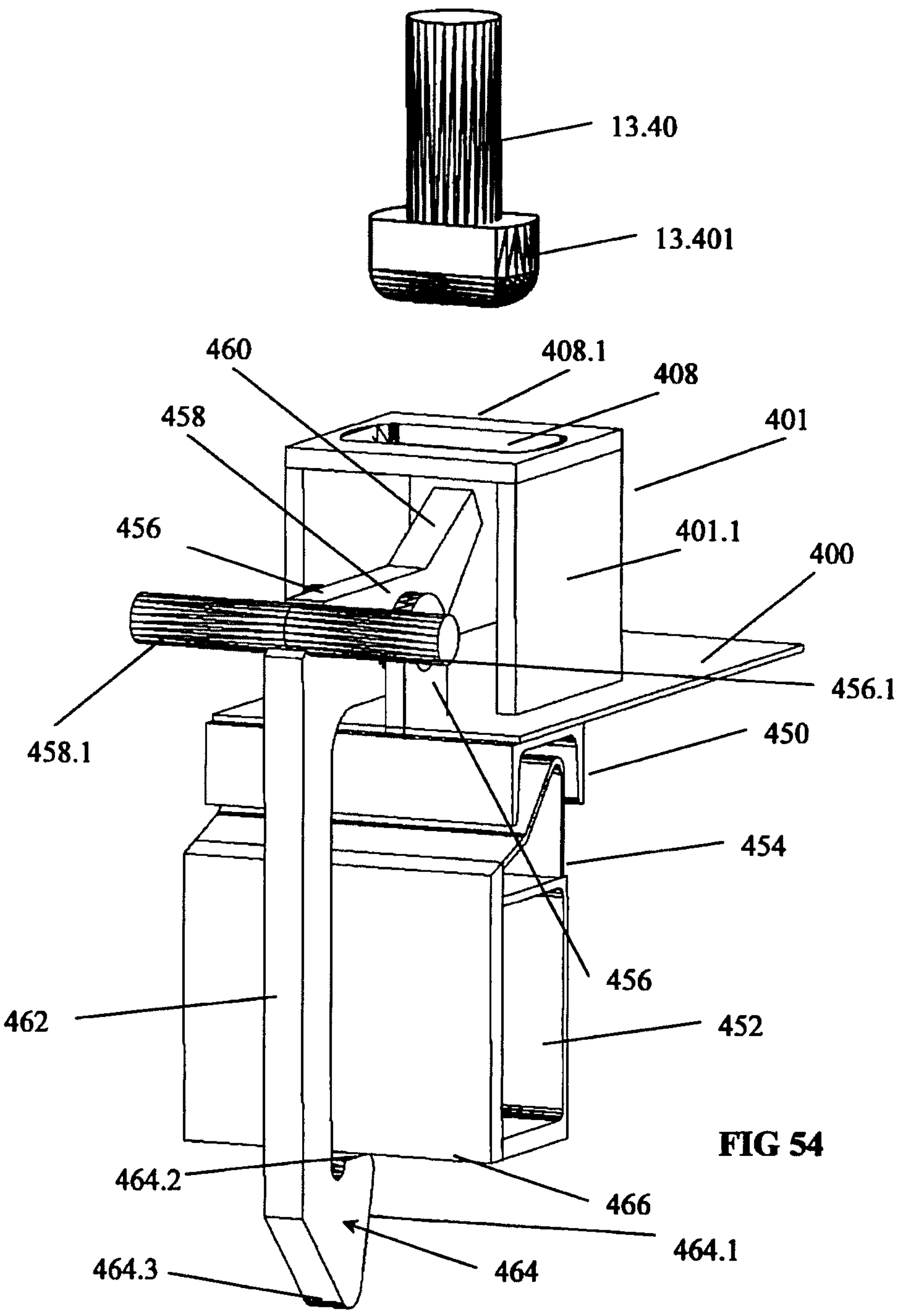
FIG. 54 illustrates an alternative lid locking and lifting mechanism.
Figure 55:
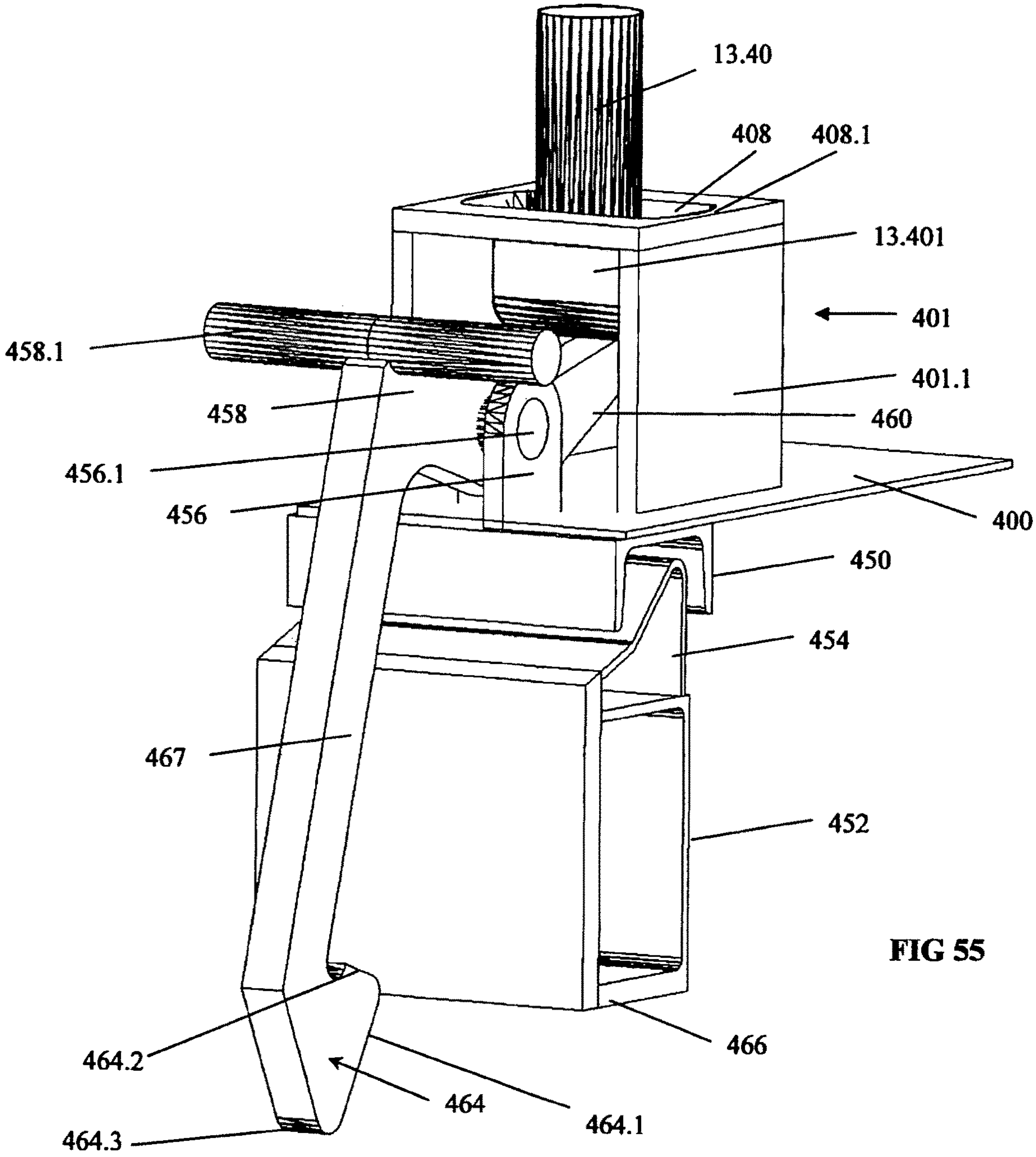
FIG. 55 illustrates the lid locking and lifting mechanism of FIG. 54, shown in an unlocked condition.
Figure 56:
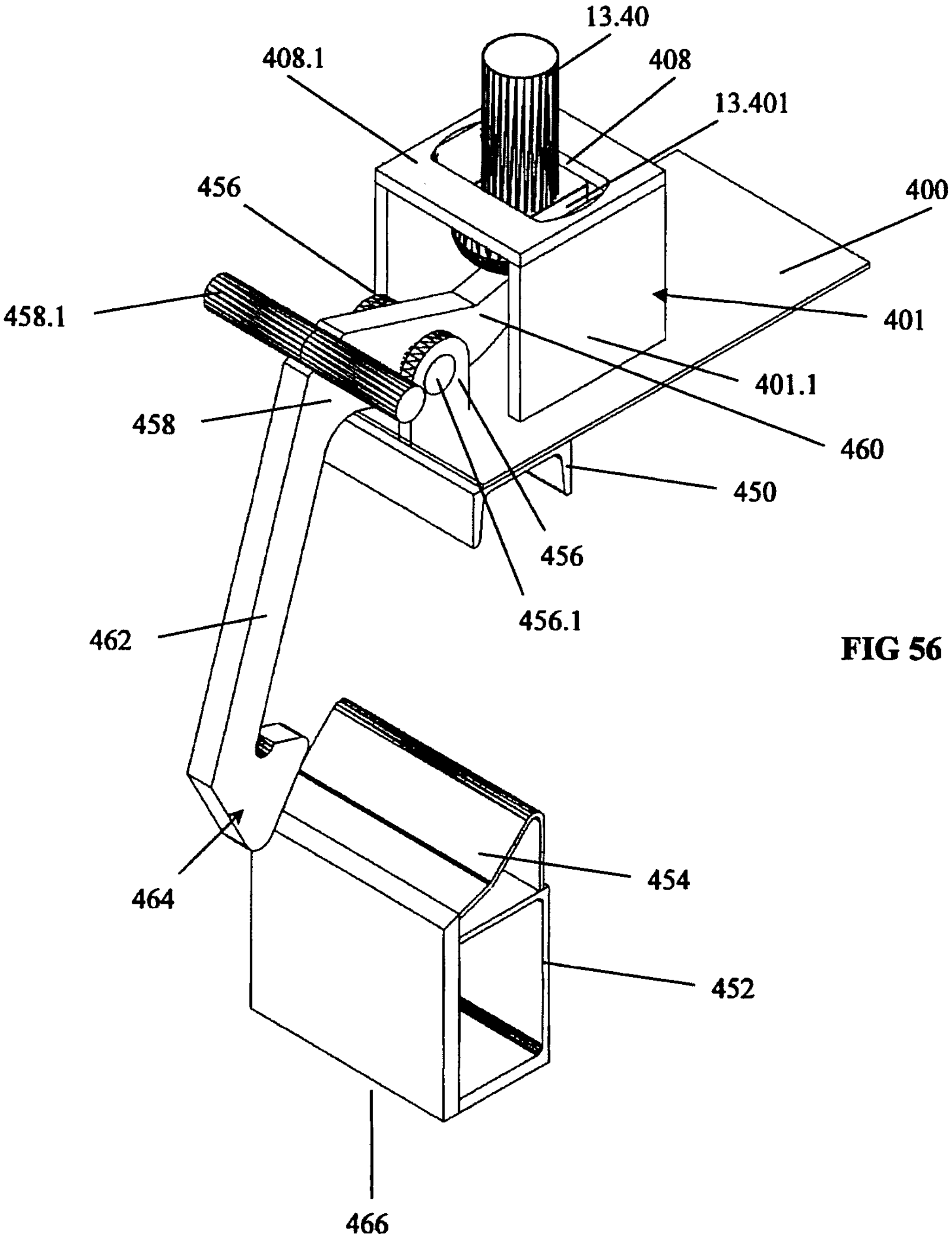
FIG. 56 illustrates the mechanism of FIGS. 54 and 55 where the lid is lifted while the lock is open.

Illustrated in FIGS. 54 to 56 is an alternative lid locking and lifting arrangement to the ones described above.

The lid locking and lifting arrangement illustrated in FIGS. 54 to 56 has an apertured lifting housing 401 which is attached to an upper surface of a lid 400, and has side walls 401.1 and an upper side 408.1 in which an aperture 408 is located in the generally horizontal upper side 408.1. Like the previous embodiments illustrated in FIG. 18 to 21, 33, 37 to 39, or 40 the aperture 408 is accessed by a downward motion of a descending twist lock 13.40 or similar device, which is mounted on a lid lifting assembly. The downward motion is generally parallel to the lifting direction of the lid and or container which is in the opposite direction.

The housing 401 is attached to the upper surface of the lid 400 by appropriate means such as welding and is located adjacent a pair of flanges 456 mounted to the lid 400, or to a plate on which the housing 401 and flanges 456 can be mounted. The flanges 456 provide a yoke for an axle or pivot 456.1 associated with latch 458 which is pivotally attached to the lid 400.

The lid 400 in this embodiment includes a peripheral channel 450, which provides two downwardly extending spaced apart flanges to allow the lid 400 to seal relative to the upper cuneiform cross sectioned rim 454 which is welded to the upper rail 452 of the container.

The latch 458 includes a lever portion 460 which is angled at approximately 30 degrees to the direction of extension of the horizontal portion of latch 458 and a downwardly extending section 462 on the end of which is a hook or lock portion 464 which has an upper edge 464.2 which will engage the underneath edge or surface of the rail 452 when in the condition is illustrated in FIG. 54 the lid 400 is locked to the container rail 452 and cannot be removed therefrom. The hook portion 464 also has a tapered or inclined portion 464.1 and a rounded end 464.2, which if the lock were in the closed condition when a lid 400 were placed onto a container, the engagement of the end 464.3 and surface 464.1 with the upper cuneiform cross sectioned rim 454, will cause the latch 458 to move to the open condition and track around the outer surface of the upper rail 452, until the hook portion 464 clears the under surface 466 of the rail 452, where by gravity will urge the hook portion 464 to move under the rail 452, and thereby lock to prevent upward movement of the lid 400 relative to the rail 452.

As the mass of the latch 458 on the outboard side of the pivot is much greater than the mass of the lever portion 460 the latch 458 will remain in a generally locked condition. This mass is further supplemented by the mass of a generally horizontal handle 458.1 which also allows the locking system of FIGS. 54 to 56 to be manually opened where required. If required additional biasing by means of torsion springs, compression springs, tension springs etc could be utilised with the embodiment of FIGS. 54 to 56.

When a twist lock or lock member 13.40 mounted on a lifting means is passed downwardly into and through the aperture 408 by the head 13.401 being aligned with the direction of the elongated aperture 408, the head 13.401 will pass through the aperture 408 and the underneath thereof will engage the lever portion 460. Continued movement of the head 13.401 in a downward direction will rotate the portion 460 in a downward direction, or direction towards the lid 400, thus causing the lock portion 464 of the latch to be rotated out of engagement with the underneath of the rail 452, as is illustrated in the FIG. 55. When the head 13.401 is rotated through 90 degrees and thus cannot escape from the housing for 401, which maintains while it rotates the lever in its depressed condition (keeping the lock open) retraction of the head 13.401 in a vertical direction will cause the lid 400 to move with housing 401 as the upper faces of the head 13.401 will engage the underside surfaces of the upper plate 408.1. It will be noted that as the head 13.401 is rotated through 90 degrees the lever portion 460 is maintained in a depressed condition thereby maintaining the lock portion 464 in a location which is clear of the bottom of the rail 452.

It is envisaged that a lid 400 may have a multiple number of the locking system of FIGS. 54 to 56 with the lid lifting device also having an equal number of such twist lock heads 13.401.

To replace the lid after the lid has been lifted by the lid lifting device, the lid is lowered back on to the container until the channel 450 engages the upper edge 454 of the rail 452. Once in position, the twist lock head 13.401 is rotated so as to align the longitudinal axis of the head 13.401 with the longitudinal axis of the aperture 408 and in this condition to then withdraw the head 13.401 through the aperture 408 in an upward direction. This causes the latch 458 to move from the position of FIGS. 55 and 56 back to the condition illustrated in FIG. 54 whereby the lock portion 464 is relocated underneath the underneath edge of the rail 452.

The lever portion 460 is illustrated in a relatively simple form in FIGS. 54 to 56. It may be additionally useful that it be constructed with a plate on its end which is of closer width to that of the housing 401, or made of greater thickness, so that as the lock member 13.401 is rotated, there will be little or no risk that the member 13.401 might become disengaged from the lever 460.

The lid lifting systems described above enable the lid lift member to engage apertured formations 401 to:

1. simultaneously lock the lid lift member to the apertured formation and to unlock the lid from the container (the embodiments of FIGS. 37 to 40);

2. sequentially unlock the lid from the container and then lock the lid lift member to the apertured formation (the embodiment of FIG. 54 to 56); or 3. sequentially lock the lid lift member to the apertured formation then unlock the lid from the container (embodiment of FIGS. 18 and 33).

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A container and lid combination, comprising:

a bulk material transport container having an open top for discharge of bulk material;

a lid having a cover portion which is sized and shaped to be received onto said open top container so as to cover, at least substantially, an opening at the top of said container, said cover portion including at least one aperture formation into which can be received a lift member such as a rotatable or twist locking member, which is located on a lifting cable or lifting frame, for releasably locking said cable or said frame to said lid; and at least one lid lock to lock the lid to said container, said lid lock being adapted to be engaged by said cable or said frame so as to unlock the lid from the container;

wherein said at least aperture formation is located at at least one location above said opening at the top of the container.

2. A container and lid as claimed in claim 1, wherein four aperture formations are formed on said lid.

3. A container and lid as claimed in claim 1, wherein said at least one aperture formations is a fitting which complies with ISO standards.

4. A container and lid as claimed in claim 1, wherein said at least one aperture formation cooperates with a locking mechanism of said lid lock.

5. A container and lid as claimed in claim 1, wherein said at least one aperture formation receives a respective a lift member to thereby cause said lid to be unlocked from said container.

6. A container and lid as claimed in claim 5 wherein an action of said lift member entering said at least one aperture formation causes a lever of said locking mechanism to move said locking mechanism from a locked to an unlocked condition.

7. A container and lid as claimed in claim 5, wherein an action of said lift member entering said at least one aperture formation enables a portion of said lock mechanism to be rotated from a locked to an unlocked condition.

8. A container and lid as claimed in claim 1, wherein the at least one aperture formation is associated with a lever means which is configured, when rotated, to cause a lock which engages said container to be released.

9. A container and lid as claimed in claim 8 wherein said lever means is configured for an action selected from: rotating about a generally vertical axis; and rotating about a generally horizontal axis; and is biased to a locked condition by means of at least one of: gravity, a spring bias, a portion spring, tension spring, and a compression spring.

10. A container and lid as claimed in any claim 1, wherein said lid is manufactured from sheet metal.

11. A container and lid as claimed in claim 1 wherein one or more locking bars extend from said aperture formations to lock said lid relative to said container.

12. A container and lid as claimed in claim 1, wherein an action of lift members on a lid lifting device engaging said aperture formations on said lid causes said lid locks to move to unlocked conditions.

13. A container and lid as claimed in claim 12, wherein the lifting members, in moving to disengage from said at least one aperture formation on said lid, will cause said lid locks to move to a locked condition so that once the lift members are able to separate from said aperture formations said lid is locked to a container or said locks are in a locked condition.

14. A container and lid as claimed in claim 12, wherein said aperture formations receive a respective lift member in a vertical direction.

15. An open container and lid combination for transporting bulk materials, said open container being adapted for handling by a lifting device for lifting the container, said lid having a cover portion which is sized and shaped to be received onto said open container so as to cover, at least substantially, an opening at the top of said container, said cover portion including at least one location thereon, at least one aperture formation into which can be received a lift member which is located on a lifting cable or lifting frame for releasably locking said cable or said frame to said lid, said at least one aperture formation being located at the location adapted to be above said opening when said lid is on the container, whereby said at least one aperture formation is adapted to receive the lift member while the open container is handled by the lifting device.

* * * * *